United States Patent
Sugita et al.

(10) Patent No.: US 8,619,899 B2
(45) Date of Patent: Dec. 31, 2013

(54) INFORMATION PROCESSING APPARATUS AND SIGNAL DETERMINATION METHOD

(75) Inventors: Takehiro Sugita, Kanagawa (JP); Kunio Fukuda, Tokyo (JP)

(73) Assignee: Sony Corporation, Tokyo (JP)

( * ) Notice: Subject to any disclaimer, the term of this patent is extended or adjusted under 35 U.S.C. 154(b) by 1157 days.

(21) Appl. No.: 12/550,441

(22) Filed: Aug. 31, 2009

(65) Prior Publication Data

US 2009/0323828 A1 Dec. 31, 2009

(30) Foreign Application Priority Data

Sep. 3, 2008 (JP) ................... P2008-226346

(51) Int. Cl.
*H04L 25/34* (2006.01)
(52) U.S. Cl.
USPC ............. 375/288; 341/70; 375/232; 375/264; 375/286; 375/333; 375/348; 375/361
(58) Field of Classification Search
None
See application file for complete search history.

(56) References Cited

U.S. PATENT DOCUMENTS

2003/0194017 A1* 10/2003 Woodworth ................. 375/286
2009/0262797 A1* 10/2009 Gorecki ......................... 375/232

FOREIGN PATENT DOCUMENTS

JP          3-109843          5/1991

* cited by examiner

*Primary Examiner* — Adolf Dsouza
(74) *Attorney, Agent, or Firm* — Finnegan, Henderson, Farabow, Garrett & Dunner, L.L.P.

(57) ABSTRACT

There is provided an information processing apparatus, including a signal receiver that receives a signal encoded in such a way that a signal containing a first bit value and a second bit value, wherein the first bit value is represented by first amplitude values, the second value is represented by a second amplitude value, and polarity of the encoded signal amplitude value is reversed in each period, a conversion processor performs conversion to add a delayed signal that is delayed by delaying a signal received by the signal receiver by one period of the received signal, an inversion processor that performs inverse processing of the conversion on the signal output from the conversion processor, and an input data decoder that decodes an input data by determining the first and second values based on the amplitude value of the signal output from the inversion processor.

16 Claims, 18 Drawing Sheets

RELATED ART

CIRCUIT CONFIGURATION EXAMPLE OF CLOCK DETECTION UNIT 332

CIRCUIT CONFIGURATION EXAMPLE OF DECODER 334

FIG. 12

DETERMINATION TABLE FOR DATA DETERMINATION (STORAGE UNIT 364)

| COMPARATOR 354 | COMPARATOR 356 | COMPARATOR 358 | COMPARATOR 360 | OUTPUT DATA |
|---|---|---|---|---|
| 1 | 1 | 1 | 1 | 1 |
| 0 | 1 | 1 | 1 | 0 |
| 0 | 0 | 1 | 1 | 1 |
| 0 | 0 | 0 | 1 | 0 |
| 0 | 0 | 0 | 0 | 1 |

CIRCUIT CONFIGURATION EXAMPLE OF DECODING PROCESSING UNIT 402

CIRCUIT CONFIGURATION EXAMPLE OF INVERSION UNIT 422

RELATIONSHIP BETWEEN COMPARATOR OUTPUT AND DATA BEFORE INVERSION

| COMPARATOR 418 | COMPARATOR 420 | DATA BEFORE INVERSION |
|---|---|---|
| 1 | 1 | 1 |
| 0 | 1 | 0 |
| 0 | 0 | -1 |

DATA DETERMINATION ALGORITHM (DATA DETERMINATION UNIT 426)

| INVERSION UNIT 422 | OUTPUT DATA |
|---|---|
| 1 | 1 |
| 0 | 0 |
| -1 | 1 |

EXAMPLE OF CIRCUIT CONFIGURATION CONCERNING PROCESSING IN (A) TO (H)

INFORMATION PROCESSING APPARATUS AND SIGNAL DETERMINATION METHOD

BACKGROUND OF THE INVENTION

1. Field of the Invention

The present invention relates to an information processing apparatus and a signal determination method.

2. Description of the Related Art

Mobile terminals exemplified by mobile phones frequently include a movable member as a connecting portion between an operation portion operated by a user and a display portion in which information is displayed. For example, an opening/closing structure of a folding mobile phone is typical of such a movable member. Further, recent mobile phones have, in addition to the calling and mail functions, a viewing function of images or an imaging function and thus, it is necessary for the connecting portion to be movable complexly in accordance with usage of the user. When the viewing function of images is used, for example, the user desires to direct the display portion toward the user and the operation portion unnecessary for viewing put away. Thus, a structure allowing the orientation or position of the display portion to change in accordance with usage thereof when a mobile phone is used as an ordinary phone, used as a digital camera, used as a TV set and the like has been desired.

As a matter of fact, a large number of signal lines and power lines are wired through the connection portion between the operation portion and display portion. For example, several tens of wires are connected in parallel in the display portion (see FIG. 1). Thus, if a movable member capable of making complex motions described above is used as a connection portion, reliability and the like of such wires will significantly decrease. For such reasons, technology used is being shifted from the parallel transmission method to the serial transmission method (see FIG. 2) to reduce the number of signal lines in the connecting portion. Naturally, a technological shift for similar reasons is not limited to the world of mobile phones and occurs in the world of various electronic devices in which complex wiring is demanded. In addition to the above reason, serialization also seeks to reduce electromagnetic noise (EMI: Electro Magnetic Interference).

In the serial transmission method, transmission data is transmitted after being encoded according to a predetermined method. As the coding mode, for example, the NRZ (Non Return to Zero) coding mode, Manchester coding mode, or AMI (Alternate Mark Inversion) coding mode is used. Japanese Patent Application Laid-Open No. 3-109843, for example, discloses a technology to transmit data by using the AMI code, which is a typical example of bipolar code. Japanese Patent Application Laid-Open No. 3-109843 also discloses a technology to represent a data clock by a media value of a signal level before transmission and reproduce the data clock based on the signal level on the receiving side.

SUMMARY OF THE INVENTION

A signal in NRZ coding mode among the above coding modes contains a DC component. Thus, it is difficult to transmit a signal in the NRZ coding mode together with a DC component of a power supply or the like. On the other hand, a signal in the Manchester coding mode or AMI coding mode does not contain a DC component. Thus, such a signal can be transmitted together with a DC component of a power supply or the like. However, it is necessary for the Manchester coding mode or AMI coding mode to set up a PLL (Phase-Locked Loop) circuit to reproduce a data clock of a signal on the receiving side. Thus, with a PLL circuit on the receiving side, current consumption will increase accordingly. Moreover, data is transmitted by using rise and fall shapes of amplitude in the Manchester coding mode and thus, it is necessary to transmit data at a clock two times faster than the data rate. As a result, a higher clock operation will cause an increase in current consumption.

In view of the above issues, a code that does not contain any DC component and needs no PLL circuit during clock reproduction and a signal transmission technology using the code have been developed. According to the technology, encoding is performed in such a way that a first bit of input data containing the first bit and a second bit value that are mutually different is represented by a plurality of first amplitude values, the second bit value is represented by a second amplitude value that is different from the first amplitude values, the same amplitude value is not taken successively, and polarity of the amplitude value is reversed in each period before transmission. However, it is necessary to repeat threshold determination processing many times to determine the first and second bit values from an encoded transmission signal according to the technology.

The present invention has been made in view of the above issue and it is desirable to provide a novel and improved information providing apparatus capable of reducing the number of times of threshold determination processing when bit values are decoded from a code that does not contain any DC component and needs no PLL circuit during clock reproduction and a signal determination method.

In order to solve the above issue, according to an embodiment of the present invention, there is provided an information processing apparatus, including: a signal receiving unit that receives a signal encoded in such a way that a signal containing a first bit and a second bit value that are mutually different, wherein the first bit value is represented by a plurality of first amplitude values, and the second bit value is represented by a second amplitude value that is different from the first amplitude values, a same amplitude value is not taken successively, and polarity of the amplitude value is reversed in each period; a conversion processing unit that performs conversion processing to add a signal after being delayed by delaying an input signal by one period to the signal before being delayed on a signal received by the signal receiving unit; an inversion processing unit that performs inverse processing of the conversion processing on the signal output from the conversion processing unit; and an input data decoding unit that decodes an input data by determining the first and second bit values based on the amplitude value of the signal output from the inversion processing unit.

Also, for example, the inversion processing unit includes: a delay circuit that delays the input signal by one period; and a subtraction circuit that, when first and second signals are input, subtracts the second signal from the first signal, wherein an output signal of the delay circuit is input into the delay circuit and the output signal of the conversion processing unit is input into the subtraction circuit as the first signal and that of the delay circuit as the second signal.

For example, the information processing further includes a clock component detection unit that detects a clock component of an encoded signal based on a reversal period by detecting the reversal period of polarity held by the amplitude value of the encoded signal received by the signal receiving unit, wherein the input data decoding unit uses the clock component detected by the clock component detection unit to obtain the input data by decoding.

For example, the information processing apparatus further includes: an encoded signal generation unit that generates an encoded signal X with a transmission speed Fb in which the first bit is represented by the amplitude value 0 and the second bit value is represented by repetition of amplitude values A and −A (A is any real number); a clock signal addition unit that adds a clock signal having an amplitude value n*A (n>1) and a frequency Fb/2 to the encoded signal X with the transmission speed Fb generated by the encoded signal generation unit; and a signal transmission unit that transmits the signal output from the clock signal addition unit to the signal receiving unit via a predetermined transmission line.

Also, for example, the predetermined transmission line is a power line through which a DC current is passed and the output signal of the clock signal addition unit is transmitted after being superimposed on the DC current by the signal transmission unit and separated from the DC current by the signal receiving unit.

Also, for example, the conversion processing unit extracts two amplitude values corresponding to the first bit and one amplitude value corresponding to the second bit value using two comparators from a signal on which the conversion processing is performed to input the amplitude values into the inversion processing unit.

Also, for example, the inversion processing unit extracts two amplitude values corresponding to the first bit and one amplitude value corresponding to the second bit value using two comparators from a signal on which inverse processing of the conversion processing is performed to input the amplitude values into the input data decoding unit.

In order to solve the above issue, according to another embodiment of the present invention, there is provided a signal determination method, including the steps of: receiving a signal encoded in such a way that a signal containing a first bit and a second bit value that are mutually different, wherein the first bit value is represented by a plurality of first amplitude values, and the second bit value is represented by a second amplitude value that is different from the first amplitude values, a same amplitude value is not taken successively, and polarity of the amplitude value is reversed in each period; performing conversion processing to add a signal after being delayed by delaying an input signal by one period to the signal before being delayed on a signal received in the signal receiving step; performing inverse processing of the conversion processing on the signal on which the conversion processing is performed in the conversion processing step; and decoding an input data by determining the first and second bit values based on the amplitude value of the signal on which the inverse processing is performed in the inversion processing step.

In order to solve the above issue, according to another embodiment of the present invention, there is provided a program to cause a computer to realize functions held by the above information processing apparatus. Further, a computer readable recording medium in which the program is recorded may be provided.

According to the embodiments of the present invention described above, the number of times of threshold determination processing performed when bit values are decoded from a code that does not contain any DC component and needs no PLL circuit during clock reproduction can be reduced.

BRIEF DESCRIPTION OF THE DRAWINGS

FIG. 12 shows a configuration example of a determination table for data determination.

DETAILED DESCRIPTION OF THE PREFERRED EMBODIMENTS

Figure 1:
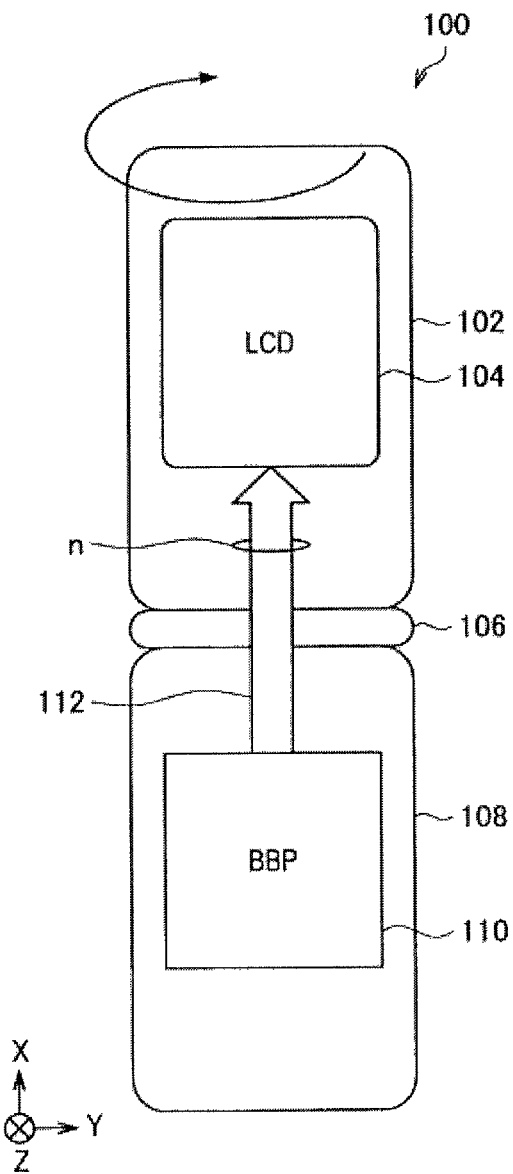
FIG. 1 shows a configuration example of a mobile terminal.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

[Flow of the Description]

The flow of the description about an embodiment of the present embodiment described below will briefly be mentioned. First, technical issues of a mobile terminal or the like that adopts the parallel transmission method will briefly be described with reference to FIG. 1. Next, issues of signal transmission technology that adopts the serial transmission method will be described with reference to FIG. 2 to FIG. 6.

Next, a new signal transmission technology developed to solve issues of the signal transmission technology that adopts the serial transmission method will be described with reference to FIG. 7 to FIG. 13. The new signal transmission technology concerns a mode in which a signal is transmitted using a code that does not contain any DC component and needs no PLL circuit during clock reproduction. The technology according to an embodiment of the present invention described below concerns a technology to make decoding processing when bit values are extracted from a signal more efficient if such a code is used.

Figure 14:
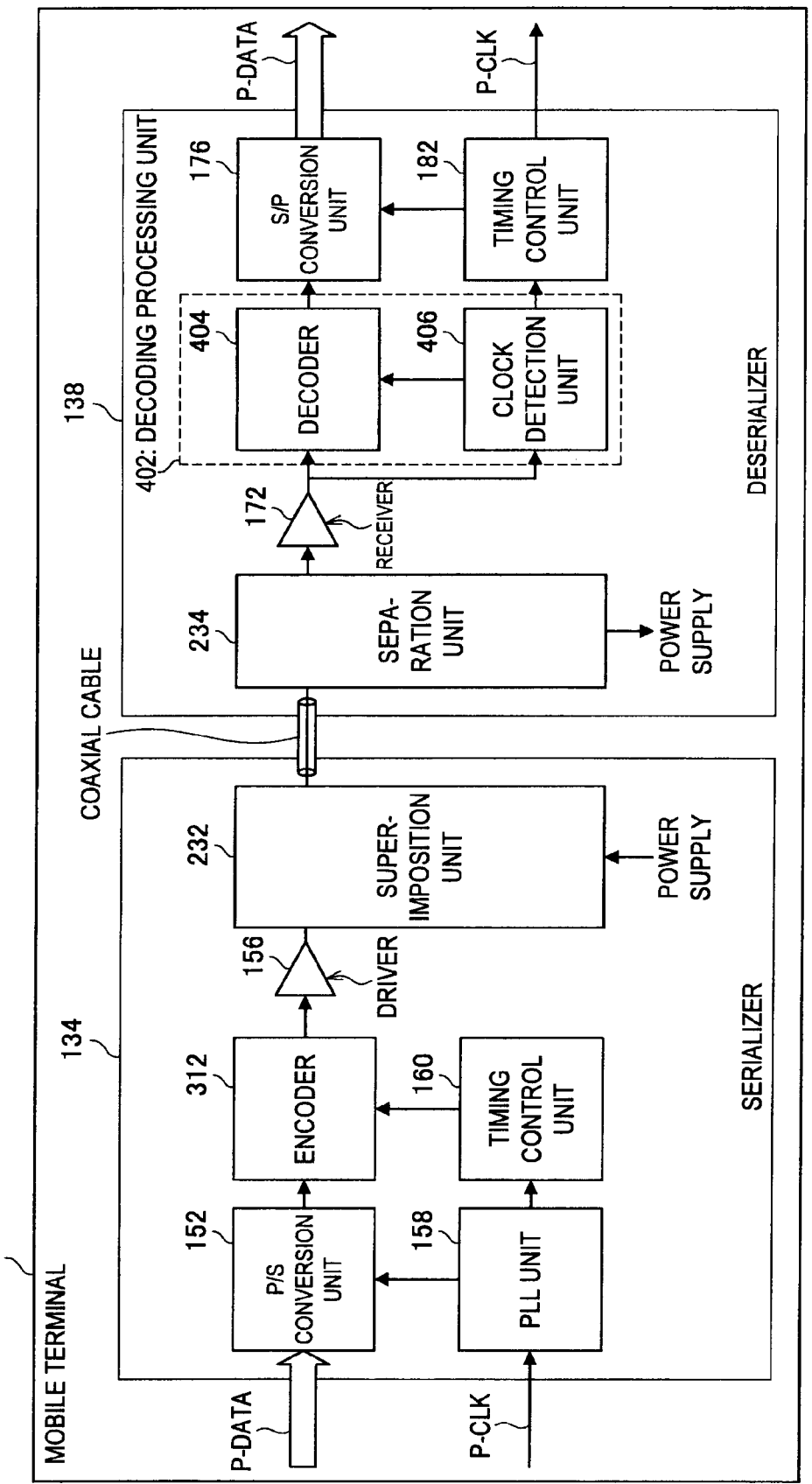
FIG. 14 shows a function configuration example of the mobile terminal according to an embodiment of the present invention.

Next, the function configuration of a mobile terminal according to an embodiment of the present invention will be described with reference to FIG. 14. Further, the circuit configuration and the like of a signal processing unit held by the mobile terminal will be described with reference to FIG. 15 to FIG. 18. Next, the overall flow of a signal processing method according to the embodiment and the overall circuit configuration to execute the signal processing method will be described with reference FIG. 19 and FIG. 20. Then, effects obtained when the signal processing method is applied will be described with reference to FIG. 21. Further, a modification of the signal processing unit according to the embodiment will be described with reference to FIG. 22. Lastly, technical ideas of the embodiment will be summarized and operation effects obtained from the technical ideas will be briefly described.

[Summary of Issues]

Before describing technology according to an embodiment of the present invention in detail, issues to be solved by the embodiment will briefly be summarized.

(Parallel Transmission Method)

A configuration example of a mobile terminal 100 in which the parallel transmission method is adopted will be briefly described with reference to FIG. 1. FIG. 1 is an explanatory view showing a configuration example of the mobile terminal 100 in which the parallel transmission method is adopted. In FIG. 1, a mobile phone is schematically illustrated as an example of the mobile terminal 100. However, the scope of application of the technology described below is not limited to the mobile phone.

As shown in FIG. 1, the mobile terminal 100 mainly includes a display unit 102, a liquid crystal unit 104 (LCD), and a connection unit 106. Further, the mobile terminal 100 mainly includes an operation unit 108, a baseband processor 110 (BBP), and a parallel signal line 112. In the description that follows, the display unit 102 may be called a display side and the operation unit 108 a main body side. A case in which an image signal is transmitted from the main body side to the display side will be described. Naturally, the technology described below is not limited to such an example.

As shown in FIG. 1, the liquid crystal unit 104 is provided in the display unit 102. Then, an image signal transmitted via the parallel signal line 112 is displayed in the liquid crystal unit 104. The connection unit 106 is a member to connect the display unit 102 and the operation unit 108. The connecting member forming the connection unit 106 has, for example, a structure to allow the display unit 102 to rotate in a Z-Y plane up to 180 degrees. The connecting member also has a structure to allow the display unit 102 to be rotatably formed in an X-Z plane so that the mobile terminal 100 can be folded. Incidentally, a connecting member having a complex movable configuration so that the display unit 102 is directed in any direction may be used.

The baseband processor 110 is an arithmetic processing unit that provides communication control of the mobile terminal 100 and an execution function of applications. Parallel signals output from the baseband processor 110 are transmitted to the liquid crystal unit 104 of the display unit 102 through the parallel signal line 112. The parallel signal line 112 has a large number of signal lines wired therein. In the case of a mobile phone, for example, the number n of signal lines is about 50. The transmission speed of an image signal is about 130 Mbps when the resolution of the liquid crystal unit 104 is QVGA. The parallel signal line 112 is wired so as to pass through the connection unit 106.

That is, the connection unit 106 has a large number of signal lines forming the parallel signal line 112 wired therein. If the movable range of the connection unit 106 is extended as described above, the parallel signal line 112 may be damaged when the connection unit 106 is moved. Thus, reliability of the parallel signal line 112 will decrease. If, on the other hand, an attempt is made to maintain reliability of the parallel signal line 112, the movable range of the connection unit 106 will be significantly limited. For these reasons, the serial transmission method is frequently adopted for mobile phone and the like with the intention of making flexibility of the movable member forming the connection unit 106 consistent with reliability of the parallel signal line 112. Also from the viewpoint of electromagnetic noise (EMI), serialization of transmission lines has been promoted.

(Serial Transmission Method)

Figure 2:
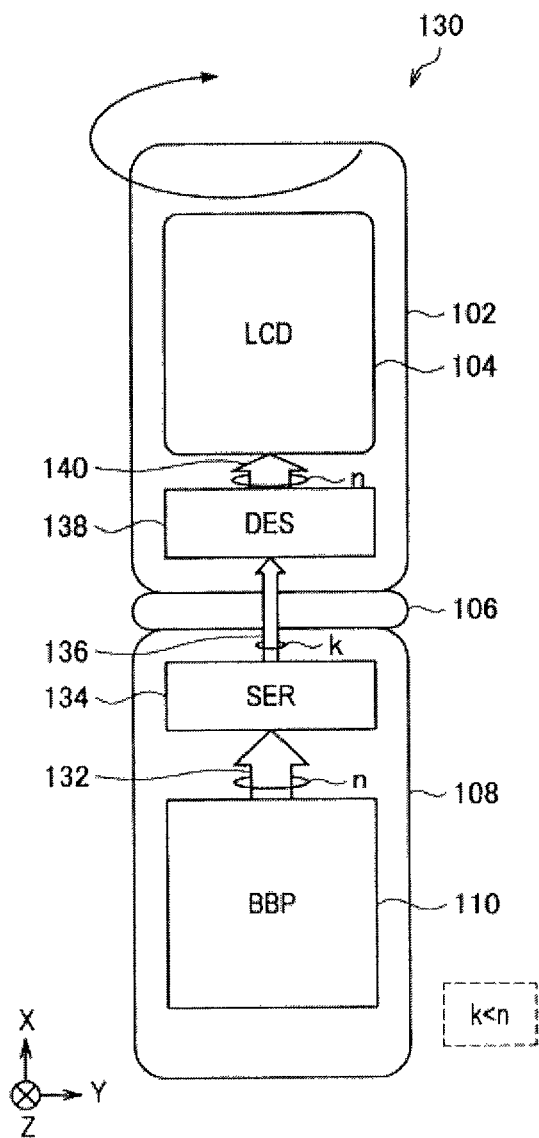
FIG. 2 shows a configuration example of a mobile terminal.

Thus, a configuration example of a mobile terminal 130 in which the serial transmission method is adopted will be briefly described with reference to FIG. 2. FIG. 2 is an explanatory view showing a configuration example of the mobile terminal 130 in which the serial transmission method is adopted. In FIG. 2, a mobile phone is schematically illustrated as an example of the mobile terminal 130. However, the scope of application of the technology described below is not limited to the mobile phone. The same reference numerals are attached to components having substantially the same function as those of the mobile terminal 100 in the parallel transmission method shown in FIG. 1 to omit a detailed description thereof.

As shown in FIG. 2, the mobile terminal 130 mainly includes the display unit 102, the liquid crystal unit 104 (LCD), the connection unit 106, and the operation unit 108. Further, the mobile terminal 130 includes the baseband processor 110 (BBP), parallel signal lines 132 and 140, a serializer 134, a serial signal line 136, and a deserializer 138.

In contrast to the mobile terminal 100, the mobile terminal 130 transmits an image signal and the like (serial signal) by the serial transmission method through the serial signal line 136 wired in the connection unit 106. Thus, the operation unit 108 is provided with the serializer 134 to serialize parallel signals output from the baseband processor 110. On the other hand, the display unit 102 is provided with the deserializer 138 to parallelize a serial signal transmitted through the serial signal line 136.

The serializer 134 converts parallel signals output from the baseband processor 110 and input via the parallel signal line 132 into a serial signal. The serial signal output from the serializer 134 is input into the deserializer 138 through the serial signal line 136. Then, the deserializer 138 restores the original parallel signals based on the input serial signal and inputs the parallel signals into the liquid crystal unit 104 through the parallel signal line 140.

A data signal encoded by, for example, the NRZ coding mode is alone transmitted or a data signal and a clock signal are together transmitted through the serial signal line 136. The number k of wires in the serial signal line 136 is significantly smaller than the number n of wires in the parallel signal line 112 in the mobile terminal 100 in FIG. 1 ($1 \leq k \ll n$). For example, the number k of wires can be reduced up to several wires.

Thus, flexibility of the movable range of the connection unit 106 in which the serial signal line 136 is wired can be considered to be extremely larger than that of the connection unit 106 in which the parallel signal line 112 is wired. Thus, reliability of the serial signal line 136 can be improved greatly by serializing the transmission line of signal. Incidentally, a differential signal such as an LVDS (Low Voltage Differential Signal) is used in most cases as a serial signal passing through the serial signal line 136.

(Function Configuration)

Figure 3:
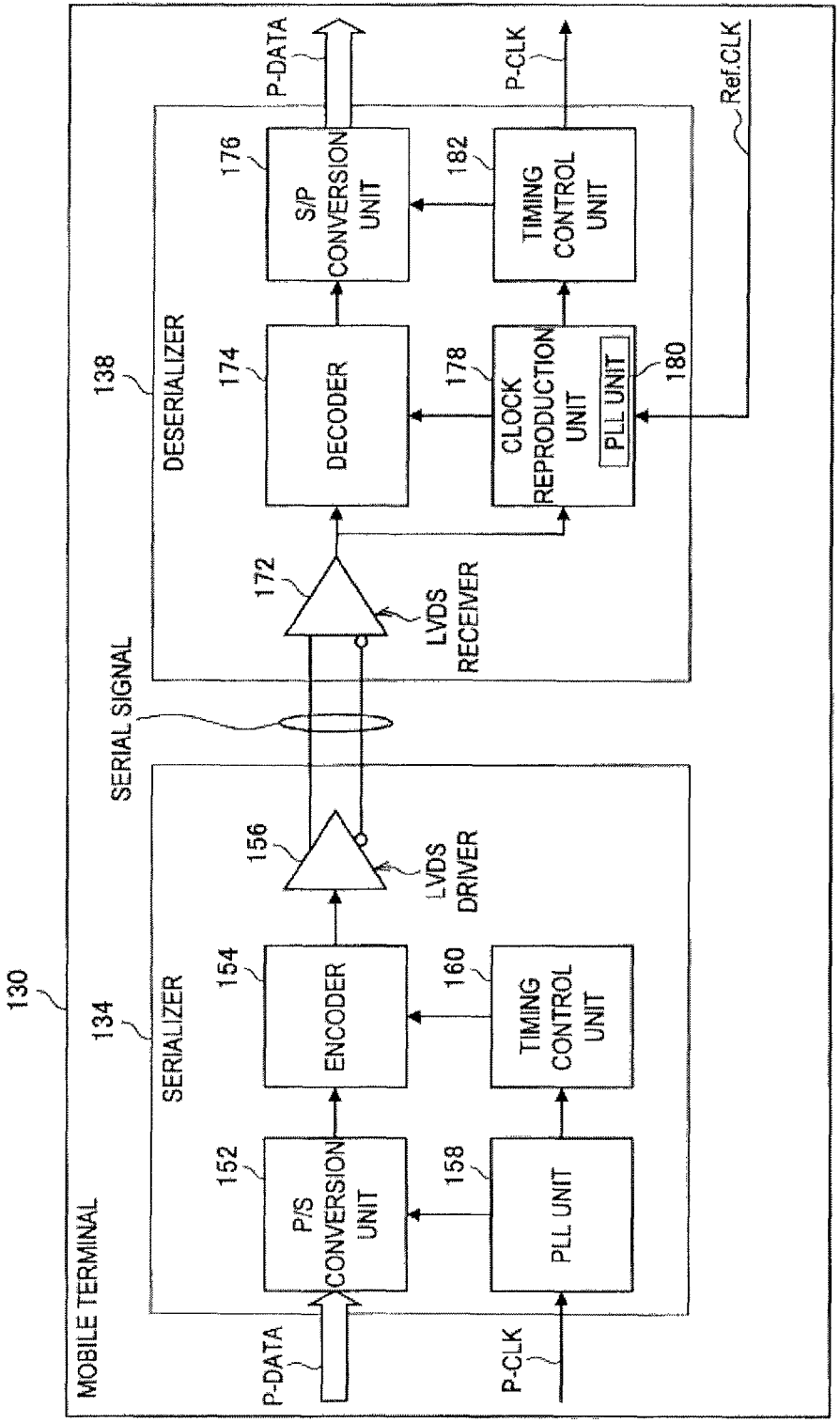
FIG. 3 shows a function configuration example of the mobile terminal according to serial transmission.

Here, the function configuration of the mobile terminal 130 in which the serial transmission method is adopted will be described with reference FIG. 3. FIG. 3 is an explanatory view showing a function configuration example of the mobile terminal 130 in which the serial transmission method is adopted. However, FIG. 3 is an explanatory view illustrated by focusing on the function configuration of the serializer 134 and the deserializer 138 and omits an illustration of other components.

(Serializer 134)

As shown in FIG. 3, the serializer 134 includes a P/S conversion unit 152, an encoder 154, an LVDS driver 156, a PLL unit 158, and a timing control unit 160.

First, parallel signals (P-DATA) and a clock for parallel signals (P-CLK) are input from the baseband processor 110 into the serializer 134. The parallel signals input into the serializer 134 are converted into a serial signal by the P/S conversion unit 152. The serial signal converted by the P/S conversion unit 152 is input into the encoder 154. The encoder 154 adds a header and the like to the serial signal and inputs the serial signal into the LVDS driver 156. The LVDS driver 156 transmits the input serial signal to the deserializer 138 by a differential transmission method using the LVDS.

The clock for parallel signals input into the serializer 134 is input into the PLL unit 158. The PLL unit 158 generates a clock for serial signal from the clock for parallel signals and inputs the clock for serial signal into the P/S conversion unit 152 and the timing control unit 160. The timing control unit 160 controls transmission timing of a serial signal by the encoder 154 based on the input signal for serial signal.

(Deserializer 138)

The deserializer 138 mainly includes the LVDS receiver 172, the decoder 174, the S/P conversion unit 176, the clock reproduction unit 178, the PLL unit 180, and the timing control unit 182.

A serial signal is transmitted to the deserializer 138 from the serializer 134 by the differential transmission method using the LVDS. The serial signal is received by the LVDS receiver 172. The serial signal received by the LVDS receiver 172 is input into the decoder 174 and the clock reproduction unit 178. The decoder 174 detects a starting portion of data by referencing the header of the input serial signal and inputs the serial signal into the S/P conversion unit 176. The S/P conversion unit 176 converts the input serial signal into parallel signals (P-DATA). The parallel signals converted by the S/P conversion unit 176 are output to the liquid crystal unit 104.

On the other hand, the clock reproduction unit 178 references a reference clock input from outside and uses the built-in PLL unit 180 to reproduce a clock for parallel signals from a clock for serial signal. The clock for parallel signals reproduced by the clock reproduction unit 178 is input into the decoder 174 and the timing control unit 182. The timing control unit 182 controls reception timing based on the clock for parallel signals input from the clock reproduction unit 178. The clock for parallel signals (P-CLK) input into the timing control unit 182 is output to the liquid crystal unit 104.

Thus, parallel signals (P-DATA) and a clock for parallel signals (P-CLK) input from the baseband processor 110 into the serializer 134 are transmitted to the deserializer 138 after being converted into a serial signal. Then, the input serial signal is restored to the original parallel signals and clock for parallel signals by the deserializer 138 before being output to the liquid crystal unit 104.

By converting parallel signals into a serial signal for transmission like the mobile terminal 130 described above, the transmission line thereof is serialized. As a result, the movable range of a portion where the serial signal line is arranged is extended, enhancing flexibility of regarding the arrangement of the display unit 102. Thus, when, for example, TV broadcasting is viewed using the mobile terminal 130, the mobile terminal 130 can be deformed so that the arrangement of the display unit 102 looks long sideways. With such enhanced flexibility, uses of the mobile terminal 130 are increased so that, in addition to various functions as a communication terminal, various uses such as viewing of images or music are being devised.

(Application Example: Data Transmission Method Using a Power Line)

Incidentally, the encoder 154 of the mobile terminal 130 may be configured to encode input data based on the Manchester coding mode that does not contain any DC component. In this case, an encoded signal contains no DC component and thus can be transmitted by being superimposed on a power supply. The configuration of a mobile terminal 230 obtained by applying the mobile terminal 130 to a power line transmission method will be described.

(Function Configuration)

Figure 4:
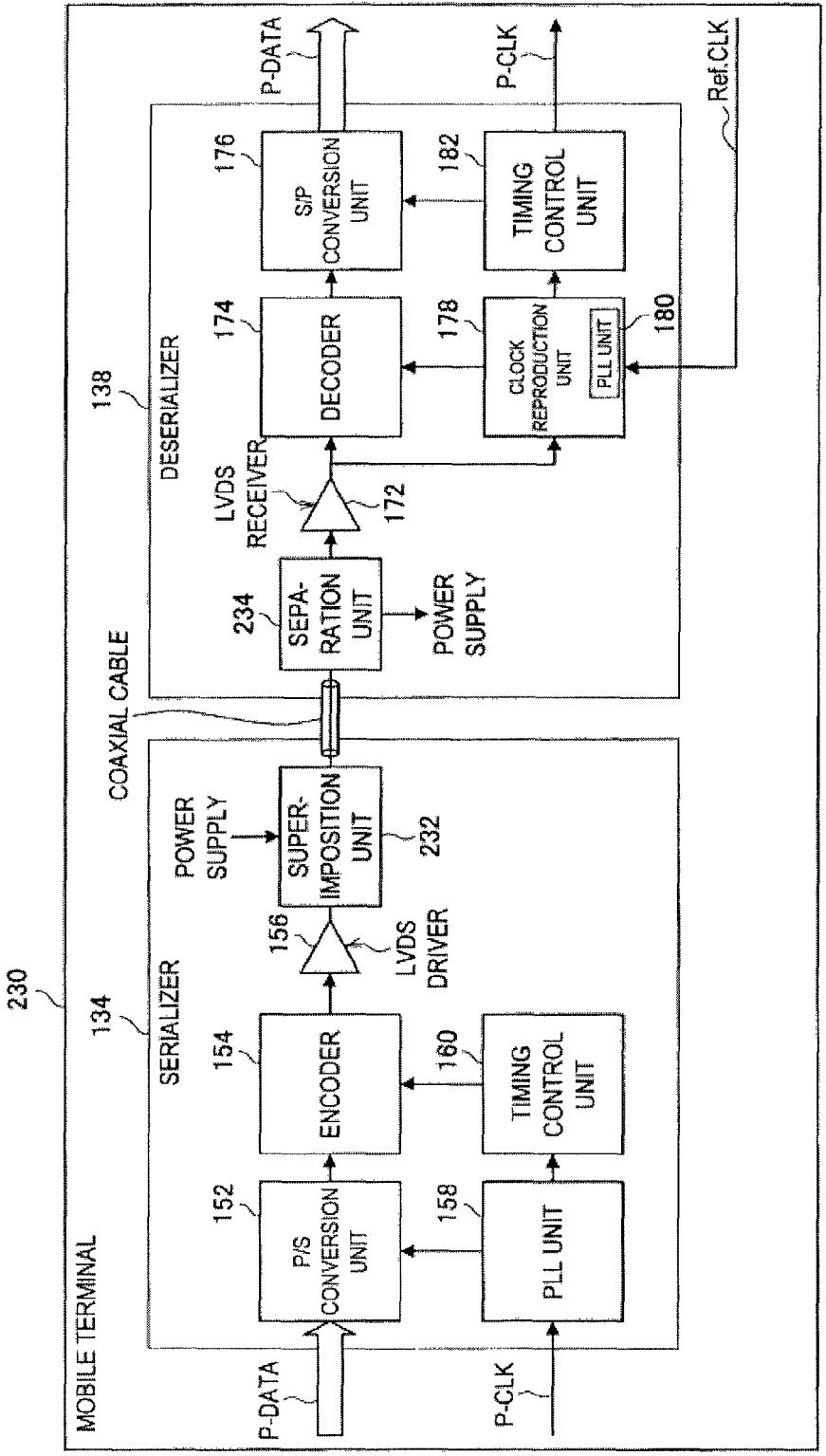
FIG. 4 shows a function configuration example of the mobile terminal according to serial transmission.

First, the function configuration of the mobile terminal 230 capable of transmitting data using a power line will be described with reference to FIG. 4. FIG. 4 is an explanatory view exemplifying the function configuration of the mobile terminal 230 capable of transmitting data using a power line. However, FIG. 4 is an explanatory view drawn by focusing on the function configuration of the serializer 134 and the deserializer 138 and other components are omitted. The same reference numerals are attached to, among components of the mobile terminal 230, components having substantially the same function as those of the mobile terminal 130 and a detailed description thereof is omitted.

(Serializer 134)

The serializer 134 includes the P/S conversion unit 152, the encoder 154, the LVDS driver 156, the PLL unit 158, and the timing control unit 160.

Parallel signals (P-DATA) and a clock for parallel signals (P-CLK) are input from the baseband processor 110 into the serializer 134. The parallel signals input into the serializer 134 are converted into a serial signal by the P/S conversion unit 152. The serial signal converted by the P/S conversion unit 152 is input into the encoder 154. The encoder 154 adds a header and the like to the serial signal and encodes the serial signal by a method such as the Manchester coding mode that has no DC component (or a small amount of DC component). The signal output from the encoder 154 is input into the LVDS driver 156.

The LVDS driver 156 converts the input serial signal into an LVDS, which is input into a superimposing unit 232. The superimposing unit 232 transmits the signal input from the LVDS driver 156 to the deserializer 138 by superimposing the signal on a power line. For example, the superimposing unit 232 couples the signal by a capacitor and a power supply by a choke coil. Then, the signal superimposed on the power supply by the superimposing unit 232 is input into the deserializer 138 through the power line. The power line is a line provided to supply power from the operation unit 108 to the display unit 102. For example, a coaxial cable is used as a transmission line for the power line.

The clock for parallel signals input into the serializer 134 is input into the PLL unit 158. The PLL unit 158 generates a clock for serial signal from the clock for parallel signals and inputs the clock for serial signal into the P/S conversion unit 152 and the timing control unit 160. The timing control unit 160 controls transmission timing of a serial signal by the encoder 154 based on the input clock for serial signal.
(Deserializer 138)

The deserializer 138 mainly includes the LVDS receiver 172, the decoder 174, the S/P conversion unit 176, the clock reproduction unit 178, the PLL unit 180, the timing control unit 182, and a separation unit 234.

Figure 5:
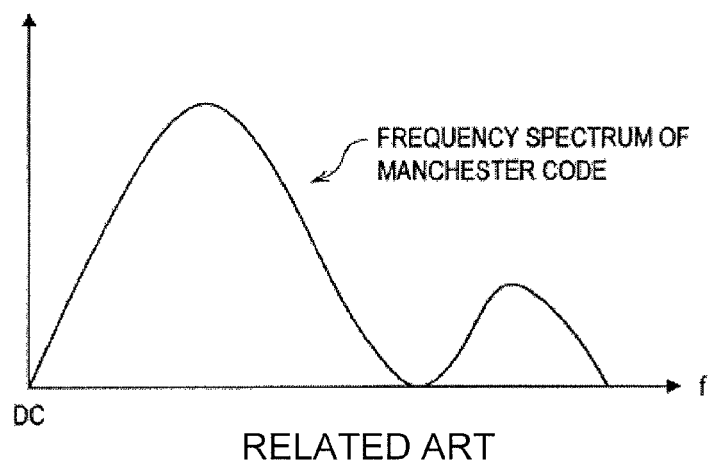
FIG. 5 exemplifies a frequency spectrum of a Manchester code.

A signal obtained by superimposing a serial signal on a power supply is input into the deserializer 138 through the power line (coaxial cable). The frequency spectrum of the superimposed signal is as shown in FIG. 5. As shown in FIG. 5, the frequency spectrum of a Manchester code has no DC component. Thus, it is clear from FIG. 5 that a transmission signal (encoded signal) of data encoded in the Manchester coding mode can be transmitted together with a power supply (DC).

FIG. 4 will be referenced again. The superimposed signal is separated into a serial signal and a power supply by the separation unit 234. For example, the separation unit 234 extracts a serial signal by cutting off a DC component using a capacitor and a power supply by cutting off high-frequency components using a choke coil. The serial signal separated by the separation unit 234 is received by the LVDS receiver 172.

The serial signal received by the LVDS receiver 172 is input into the decoder 174 and the clock reproduction unit 178. The decoder 174 detects a starting portion of data by referencing the header of the input serial signal, decodes the serial signal encoded in the Manchester coding mode, and inputs the decoded serial signal into the S/P conversion unit 176. The S/P conversion unit 176 converts the input serial signal into parallel signals (P-DATA). The parallel signals converted by the S/P conversion unit 176 are output to the liquid crystal unit 104.

On the other hand, the clock reproduction unit 178 references a reference clock input from outside and uses the built-in PLL unit 180 to reproduce a clock for parallel signals from a clock for serial signal. The clock for parallel signals reproduced by the clock reproduction unit 178 is input into the decoder 174 and the timing control unit 182. The timing control unit 182 controls reception timing based on the clock for parallel signals input from the clock reproduction unit 178. The clock for parallel signals (P-CLK) input into the timing control unit 182 is output to the liquid crystal unit 104.

Thus, the mobile terminal 230 can transmit a power supply and a serial signal (such as an image signal) by one coaxial cable. Thus, only one wire connects the operation unit 108 and the display unit 102 so that mobility of the display unit 102 can be improved and the mobile terminal 230 can be deformed into a complex shape. As a result, more uses of the mobile terminal 230 can be found and user convenience is improved.
(Summary 1 of Issues)

As described above, in order to freely change the relative spatial relationship between the operation unit 108 and the display unit 102, the parallel transmission method is inconvenient like the case of the mobile terminal 100 described above. Thus, like the above mobile terminal 130, serial transmission of an image signal or the like is enabled by providing the serializer 134 and the deserializer 138 to increase the movable range of the display unit 102. Further, mobility of the display unit 102 is further improved by using a method of transmission by which a signal is superimposed on a power line for transmission by making use of characteristics of the coding mode used by the mobile terminal 130.

However, as shown in FIG. 3 and FIG. 4, the mobile terminals 130 and 230 are provided with the PLL unit 180 (hereinafter, PLL) to reproduce a clock of a received serial signal. It is necessary to have the PLL to extract a clock from a signal encoded in the Manchester coding mode or the like. However, power consumption by the PLL itself is not low. Thus, providing the PLL increases power consumption of the mobile terminals 130 and 230 accordingly. Such an increase in power consumption poses a very serious issue for a small apparatus such as a mobile phone.

Regarding the above technical issue, a method of eliminating the need for PLL in the deserializer 138 is demanded. In response to such a demand, a new signal transmission method that transmits a signal by using a "code that does not contain any DC component and needs no PLL during clock reproduction" was recently developed. The technology according to an embodiment of the present invention described below is a technology based on this new signal transmission method. Thus, the new signal transmission method will be described here. In the description that follows, the new signal transmission method may be called the new mode.
<Basic Technology: New Mode>

The new signal transmission method (new mode) that transmits a signal by using a code that does not contain any DC component and capable of reproducing a clock without using PLL will be described below. First, characteristics of an AMI (Alternate Mark Inversion) code forming the foundation for describing the encoding method in the new mode will be briefly described. Then, the function configuration of a mobile terminal 300 according to the new mode and an encoding/decoding method according to the new mode will be described.
(Signal Waveform of AMI Code)

Figure 6:
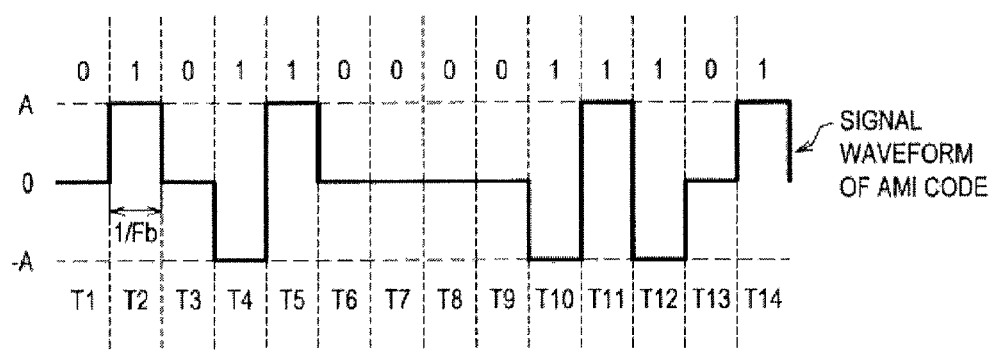
FIG. 6 exemplifies a signal waveform of an AMI code.

First, a signal waveform of AMI code and characteristics thereof will be described with reference to FIG. 6. FIG. 6 is an explanatory view exemplifying a signal waveform of an AMI code. In the description that follows, A is assumed to be any positive number.

The AMI code is a code that represents data 0 as the potential 0 and data 1 as the potential A or −A. The potential A and the potential −A are alternately repeated. That is, if data 1 appears after data 1 is represented by the potential A, the data 1 is represented by the potential −A. Since data is represented by repeating polarity reversal in this manner, the AMI code does not contain any DC component.

As a code having characteristics similar to those of the AMI code, for example, a code in partial response mode represented like PR (1, −1), PR (1, 0, −1), PR (1, 0, . . . , −1) and the like is known. Such a transmission code using polarity reversal is called a bipolar code. Such a bipolar code can be used in a signal transmission method according to the new mode. Further, a code in decode mode may be applied in a signal transmission method according to the new mode. Here, for convenience of description, an example of AMI code with 100% duty will be taken for the description below.

FIG. 6 schematically shows an AMI code of bit intervals T1, T2, . . . , T14. In FIG. 6, data 1 appears in bit intervals T2, T4, T5, T10, T11, T12, and T14. If the potential in the bit interval T2 is A, the potential in the bit interval T4 becomes −A. Furthermore, the potential in the bit interval T5 becomes A. Thus, the amplitude corresponding to data 1 is alternately reversed to the positive and negative potentials. This is the polarity reversal described above.

On the other hand, data 0 is all represented by the potential 0. Using representations described above, the AMI code does not contain any DC component, but as observed in the bit intervals T6, . . . , T9, the potential 0 may appear consecutively. If the potential 0 continues like this, it is very difficult to extract a clock component from a signal waveform without using any PLL on the receiving side. Therefore, according to the new mode, a technology to cause an AMI code (and any code having characteristics equivalent thereto) to include a clock component for transmission is used. The technology will be described below.

(Function Configuration)

Figure 7:
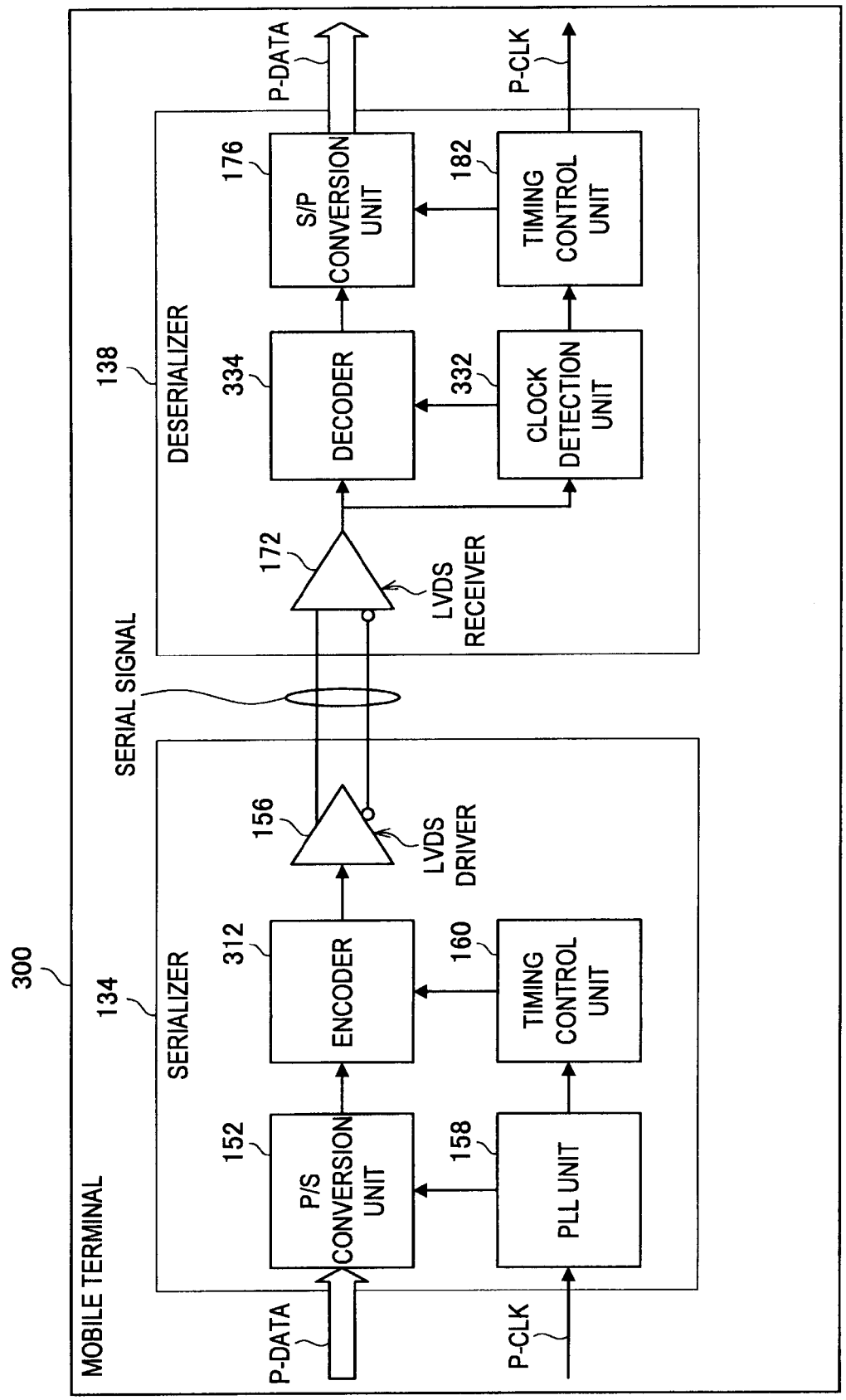
FIG. 7 shows a function configuration example of the mobile terminal according to a new mode.

Next, the function configuration of the mobile terminal 300 according to the new mode will be described with reference to FIG. 7. FIG. 7 is an explanatory view illustrating a function configuration example of the mobile terminal 300 according to the new mode. However, FIG. 7 is an explanatory view drawn by focusing on the function configuration of the serializer 134 and the deserializer 138 and other components are omitted. The same reference numerals are attached to, among components of the mobile terminal 300, components having substantially the same function as those of the mobile terminal 130 described above and a detailed description thereof is omitted.

(Serializer 134)

The serializer 134 includes the P/S conversion unit 152, the LVDS driver 156, the PLL unit 158, the timing control unit 160, and an encoder 312. A main difference from the mobile terminal 130 described above is the function held by the encoder 312.

First, parallel signals (P-DATA) and a clock for parallel signals (P-CLK) are input from the baseband processor 110 into the serializer 134. The parallel signals input into the serializer 134 are converted into a serial signal by the P/S conversion unit 152. The serial signal converted by the P/S conversion unit 152 is input into the encoder 312. The encoder 312 adds a header and the like to the serial signal and encodes the serial signal based on the predetermined coding mode (new mode) to generate an encoded signal.

Figure 8:
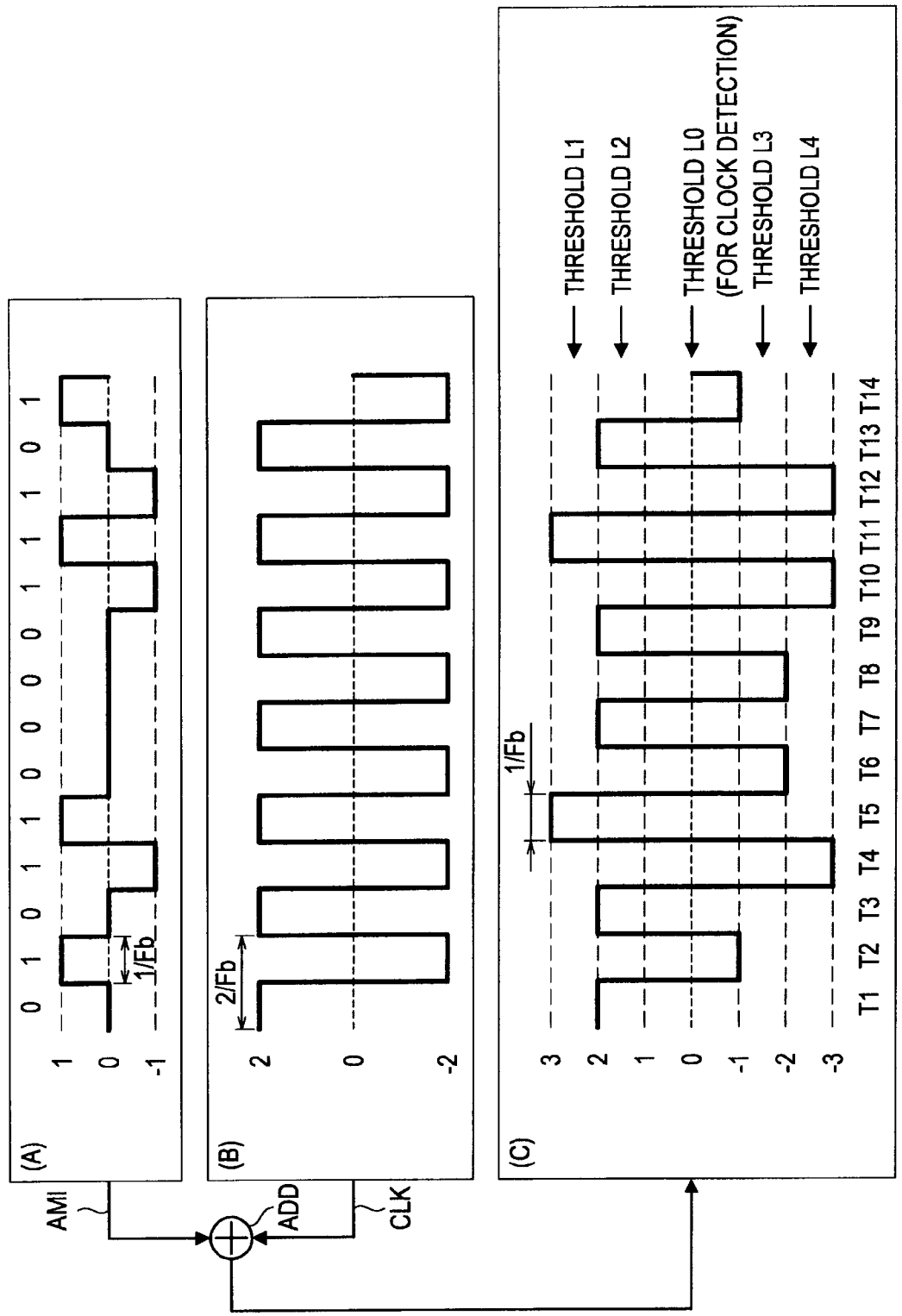
FIG. 8 shows a signal generation method according to the new mode.
Figure 9:
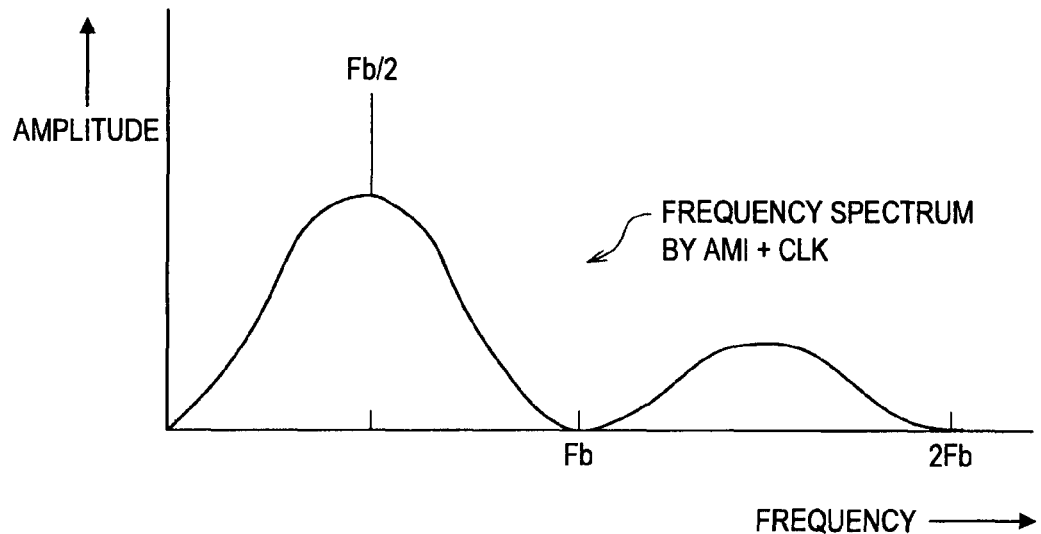
FIG. 9 exemplifies the frequency spectrum of a signal according to the new mode.

Here, the encoding method in the new mode by the encoder 312 will be described with reference to FIG. 8. FIG. 8 is an explanatory view exemplifying the encoding method according to the new mode. FIG. 8 shows a generation method of a code based on the AMI code. However, the technology according to the new mode is not limited to this and is applied to any code having characteristics similar to those of the AMI code in the same manner. The technology is applicable to, for example, a bipolar code and a code in partial response mode.

The signal illustrated in (A) is obtained by encoding input data based on the AMI coding mode. On the other hand, the signal illustrated in (C) is a signal encoded by the encoding method of the new mode based on the signal in (A). In this signal, data 1 is represented by a plurality of potentials A1 (−1, −3, 1, 3) and data 0 is represented by a plurality of potentials A2 (−2, 2) that are different from the potentials A1. The signal is formed to reverse its polarity in each period and not to take the same potential consecutively.

For example, a section in which data 0 continues is present in the bit intervals T6 to T9 in (A) and is represented as a consecutive section of the potential 0, but in (C), the potential changes like −2, 2, −2, 2 in the same section. Thus, the signal in (C) is formed in such a way that, even if the same data value appears consecutively, the polarity thereof is reversed in each period. Thus, if the signal in (C) is used for data transmission, a clock component can be reproduced by detecting both rising and falling edges on the receiving side. The method of generating the signal in (C) according to the new mode will be described below.

The encoder 312 is provided with an adder ADD to generate a code such as the above code shown in (C). For example, the encoder 312 inputs an input serial signal into the adder ADD after the serial signal being encoded into an AMI code (A). Further, the encoder 312 generates a clock (B) having a frequency (Fb/2) that is half that of an AMI code having a transmission speed Fb and inputs the clock (B) into the adder ADD. The amplitude of the clock is assumed to be N times (N>1; N=2 in the example in FIG. 8) that of the AMI code. Then, the encoder 312 generates a code (C) by adding the AMI code and the clock using the adder ADD. At this point, the AMI code and the clock are synchronized and edges thereof are aligned before being added.

FIG. 7 will be referenced again. The serial signal encoded by the encoder 312 is input into the LVDS driver 156. The LVDS driver 156 transmits the input serial signal to the deserializer 138 by the differential transmission method using the LVDS. Incidentally, the clock for parallel signals input into the serializer 134 is input into the PLL unit 158. The PLL unit 158 generates a clock for serial signal from the clock for parallel signals and inputs the clock for serial signal into the P/S conversion unit 152 and the timing control unit 160. The timing control unit 160 controls transmission timing of the serial signal by the encoder 312 based on the input clock for serial signal.

(Deserializer 138)

The deserializer 138 mainly includes the LVDS receiver 172, the S/P conversion unit 176, the timing control unit 182, a clock detection unit 332, and a decoder 334. A main difference from the mobile terminal 130 described above is the function of the clock detection unit 332 having no PLL.

A serial signal is transmitted to the deserializer 138 from the serializer 134 by the differential transmission method using the LVDS. The serial signal is received by the LVDS receiver 172. The serial signal received by the LVDS receiver 172 is input into the decoder 334 and the clock detection unit 332. The decoder 334 detects a starting portion of data by referencing the header of the input serial signal and decodes the serial signal encoded by the coding mode used by the encoder 312.

Here, the decoding method by the decoder 334 will be briefly described with reference to FIG. 8. A detailed circuit configuration of the decoder 334 will be described below. As described above, the serial signal is encoded into the format shown in (C) by the encoder 312. Thus, the serial signal can be decoded into the original serial signal by the decoder 334 by determining whether the amplitude of the received signal is A1 or A2. Four thresholds (L1, L2, L3, and L4) shown in FIG. 8 are used to determine the amplitude A1 (−1, −3, 1, 3) corresponding to data 1 and the amplitude A2 (−2, 2) corresponding to data 0. Thus, the decoder 334 compares the amplitude of the input signal and the above four thresholds to determine whether the amplitude is A1 or A2 to decode the serial signal into the original serial signal.

FIG. 7 will be referenced again. The serial signal decoded by the decoder 334 is input into the S/P conversion unit 176. The S/P conversion unit 176 converts the input serial signal into parallel signals (P-DATA). The parallel signals converted by the S/P conversion unit 176 are output to the liquid crystal unit 104.

On the other hand, the clock detection unit 332 detects a clock component from the signal received by the LVDS receiver 172. At this point, the clock detection unit 332 detects the period of the polarity reversal by comparing the amplitude value of the signal and the threshold L0 (potential 0) and reproduces the original clock by detecting a clock component based on the period. Thus, the clock detection unit 332 does not use any PLL when detecting a clock component from a signal. Therefore, there is no need to provide a PLL on the side of the deserializer 138 and power consumption of the deserializer 138 can be reduced.

The clock reproduced by the clock detection unit 332 is input into the decoder 334 and the timing control unit 182. The timing control unit 182 controls reception timing based on the clock input from the clock detection unit 332. The clock (P-CLK) input into the timing control unit 182 is output to the liquid crystal unit 104.

Thus, by using a code that does not contain any DC component (see FIG. 9) and capable of detecting a clock component from the polarity reversal period, the need for PLL to reproduce a clock is eliminated and therefore, power consumption of a mobile terminal can significantly be reduced. The frequency spectrum of a code used in the new mode has a shape as shown, for example, in FIG. 9. A line spectrum appears at frequency Fb/2 of the clock added by the adder ADD of the encoder 312 and in addition, a broad frequency spectrum of the AMI code appears. The frequency spectrum has null points at frequencies Fb, 2Fb, 3Fb . . . .

(Details of Decoding Processing)

Figure 10:
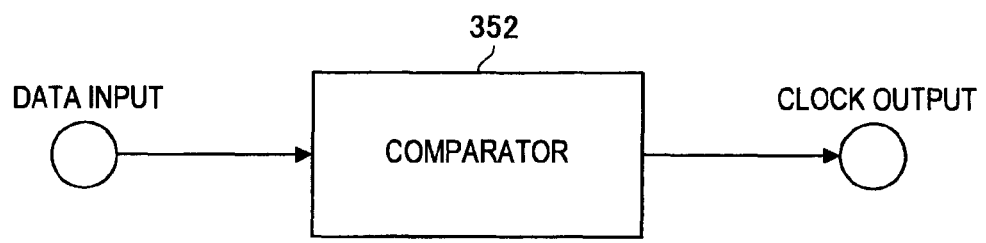
FIG. 10 shows a circuit configuration example of a clock detection unit.
Figure 11:
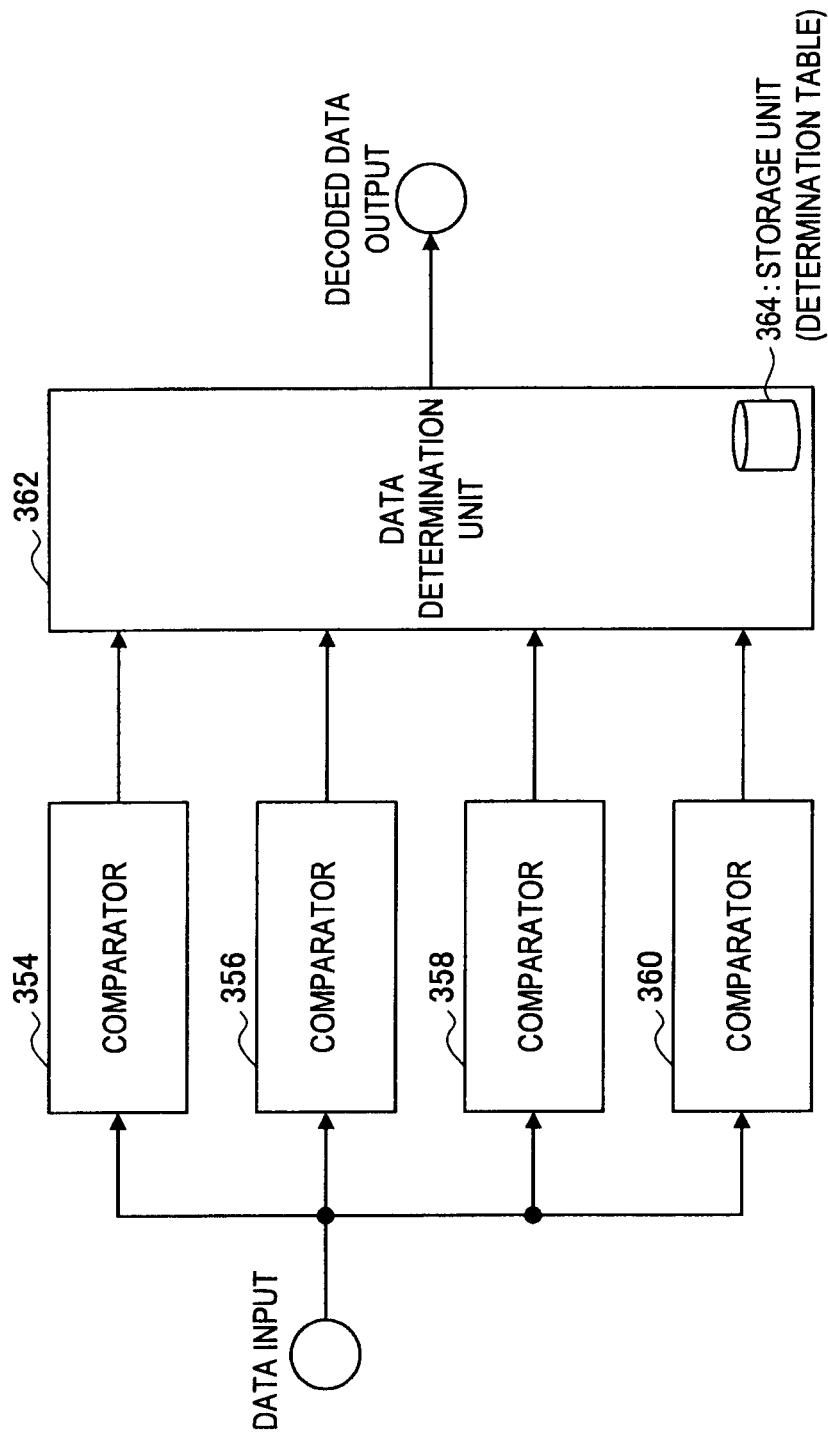
FIG. 11 shows a circuit configuration example of a decoder.
Figure 13:
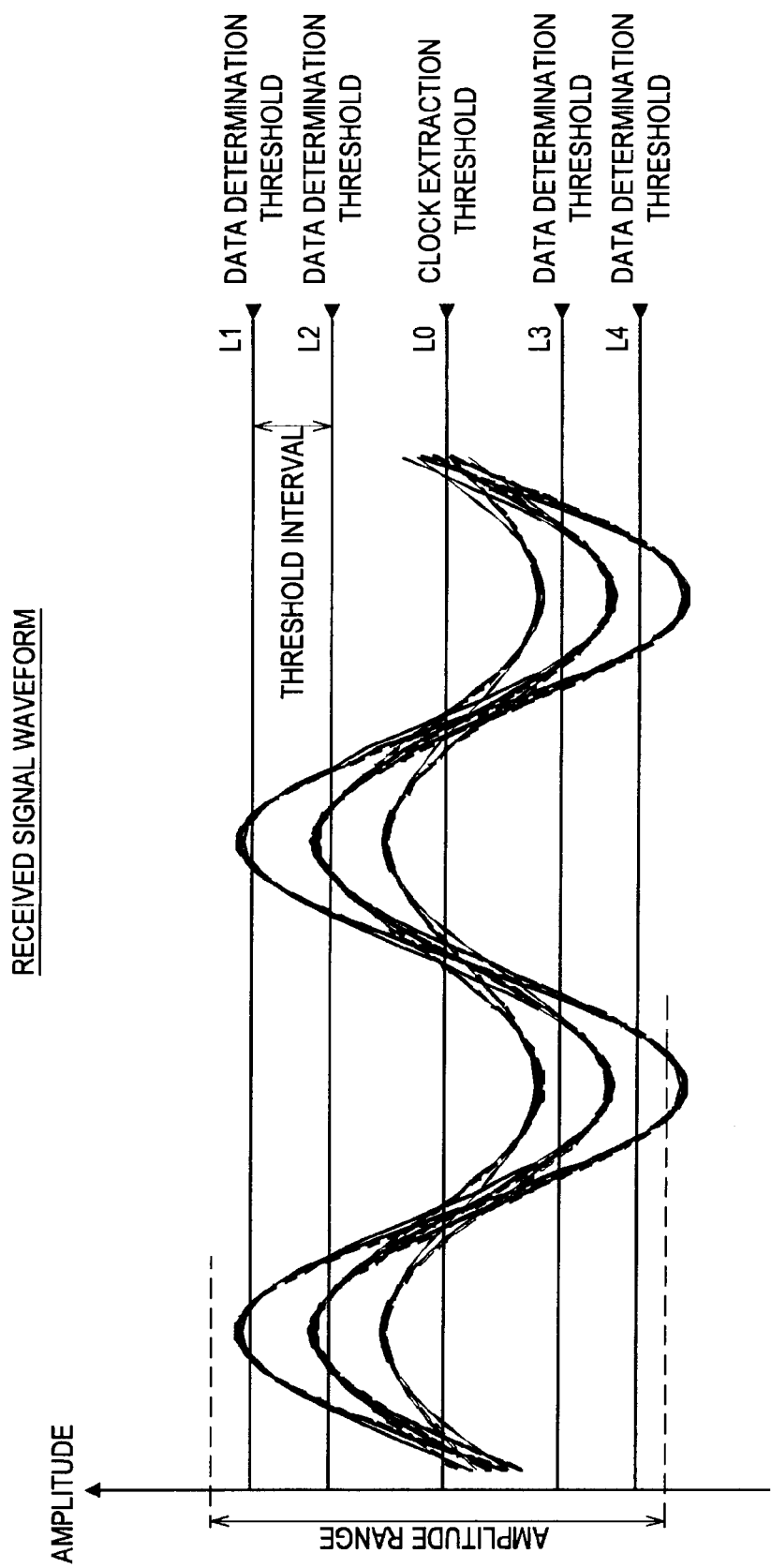
FIG. 13 shows a relationship between a received signal waveform and a data determination threshold.

Next, details of decoding processing by the new mode will be described with reference to FIG. 10 to FIG. 13. FIG. 10 is an explanatory view illustrating a circuit configuration example of the clock detection unit 332. FIG. 11 is an explanatory view illustrating a circuit configuration example of the decoder 334. FIG. 12 is an explanatory view illustrating a configuration example of a determination table for data determination. FIG. 13 is an explanatory view illustrating a received signal waveform (an eye pattern is shown in FIG. 13) when the new mode is applied.

(Circuit Configuration Example of the Clock Detection Unit 332)

First, FIG. 10 will be referenced. As shown in FIG. 10, the function of the clock detection unit 332 is realized by a comparator 352.

The amplitude value of a signal encoded in the new mode is input into the comparator 352 as input data. After the input data is input, the comparator 352 compares the input amplitude value and a predetermined threshold. For example, the comparator 352 determines whether input data is larger than the predetermined threshold. The comparator 352 is used to extract a clock from the code in the new mode (see (C) in FIG. 8). Thus, the threshold L0 is used as the predetermined threshold.

If, for example, input data is larger than the predetermined threshold, the comparator 352 outputs a determination value (for example, 1) indicating that the input data is larger than the predetermined threshold. If, on the other hand, input data is smaller than the predetermined threshold, the comparator 352 outputs a determination value (for example, 0) indicating that the input data is not larger than the predetermined threshold. An output result of the comparator 352 is input into the decoder 334 and the timing control unit 182 as a clock.

(Circuit Configuration Example of the Decoder 334)

Next, FIG. 11 will be referenced. As shown in FIG. 11, the function of the decoder 334 is realized by a plurality of comparators 354, 356, 358, and 360 and a data determination unit 362. The data determination unit 362 is provided with a storage unit 364. A determination table for data determination shown in FIG. 12 is stored in the storage unit 364.

The plurality of comparators 354, 356, 358, and 360 has mutually different thresholds set thereto. For example, the threshold L1 is set to the comparator 354, the threshold L2 to the comparator 356, the threshold L3 to the comparator 358, and the threshold L4 to the comparator 360. However, as shown in (C) of FIG. 8, the thresholds L1, L2, L3, and L4 satisfy the relationship of L1>L2>L3>L4.

First, the amplitude value of a signal encoded in the new mode is input into the plurality of comparators 354, 356, 358, and 360 as input data. At this point, the same input data is input into the comparators 354, 356, 358, and 360 in parallel.

After the input data is input, the comparator 354 compares the input data and the threshold L1 to determine whether the input data is larger than the threshold L1. If the input data is larger than the threshold L1, the comparator 354 outputs a determination value (for example, 1) indicating that the input data is larger than the threshold L1. If, on the other hand, the input data is not larger than the threshold L1, the comparator 354 outputs a determination value (for example, 0) indicating that the input data is not larger than the threshold L1.

Similarly, the comparator 356 compares the input data and the threshold L2 to determine whether the input data is larger than the threshold L2. Also, the comparator 358 compares the input data and the threshold L3 to determine whether the input data is larger than the threshold L3. Further, the comparator 360 compares the input data and the threshold L4 to determine whether the input data is larger than the threshold L4. Determination values output from the plurality of comparators 354, 356, 358, and 360 are input into the data determination unit 362.

The data determination unit 362 determines the bit value indicated by the input data based on determination values output from the plurality of comparators 354, 356, 358, and 360. At this point, the data determination unit 362 determines the bit value indicated by the input data based on the determination table for data determination (see FIG. 12) stored in the storage unit 364. For example, the determination table for data determination shown in FIG. 12 is used as a determination table for data determination. The determination table illustrated in FIG. 12 shows the correspondence between each combination of values output from the plurality of comparators 354, 356, 358, and 360 and the bit value (0 or 1).

For example, a case when the output value of the comparator 354 is 1 will be considered. In this case, input data is larger than the threshold L1. As described above, the thresholds satisfy the relationship L1>L2>L3>L4. Thus, from the above relationship, output values from the comparators 356, 358, and 360 will also be 1. Moreover, the bit value corresponding to any amplitude having a value larger than threshold L1 is 1. Therefore, the determination table shows the correspondence between the combination in which all output values of the comparators 354, 356, 358, and 360 are 1 and the bit value of 1.

Other conditions will be considered. Here, for convenience of description, output values of the comparators 354, 356, 358, and 360 are denoted as d1, d2, d3, and d4 respectively and a combination thereof as (d1, d2, d3, d4). For example, the combination (d1, d2, d3, d4)=(0, 1, 1, 1) means that input data d satisfies L1>d>L2. If input data is L1>d>L2, the bit value is 0.

Similarly, the combination (d1, d2, d3, d4)=(0, 0, 1, 1) means that input data d satisfies L2>d>L3. If input data is L2>d>L3, the bit value is 1. The combination (d1, d2, d3, d4)=(0, 0, 0, 1) means that input data d satisfies L3>d>L4. If input data is L3>d>L4, the bit value is 0. Further, the combination (d1, d2, d3, d4)=(0, 0, 0, 0) means that input data d satisfies L4>d. If input data is L4>d, the bit value is 1.

As described above, summarization of correspondences between various combinations and bit values to associate such combinations of output values output from each of the comparators 354, 356, 358, and 360 and the bit values is the determination table illustrated in FIG. 12. That is, the determination table shows a determination algorithm of the bit value determination by the data determination unit 362. Based on the determination table, the data determination unit 362 determines the bit value from the combination of the output value output from the plurality of comparators 354, 356, 358, and 360. The bit value determined by the data determination unit 362 is input into the S/P conversion unit 176.

(Summary 2 of Issues)

Thus, it is necessary to have one comparator 352 included in the clock detection unit 332 and the four comparators 354, 356, 358, and 360 included in the decode 334 to decode a code in the new mode. As described above, a code according to the new mode is very excellent in the sense that the code does not contain any DC component and is capable of reproducing a clock without using a PLL circuit. However, it is necessary to have a total of five comparators only to determine two bit values. As a result, the circuit scale grows and power consumption increases.

Further, determination processing is performed by providing five thresholds in the amplitude direction and thus, if the maximum width (amplitude range) of the signal amplitude is fixed, as shown in FIG. 13, the interval between individual thresholds will be narrower. As a result, a higher level of setting precision of the threshold and determination precision of the bit value will be demanded. In recent years, semiconductor processes become increasingly finer, leading to lower operating voltages. Accordingly, the amplitude range of a signal is becoming increasingly smaller. Moreover, it is necessary that the maximum and minimum values of the signal amplitude fall within the range of the operating voltage, as described above, in order to use a code having a plurality of bit values in the amplitude direction. Under such circumstances, it is necessary to set thresholds with very high setting precision to perform determination processing of data by providing five thresholds in the amplitude direction, which is not so realistic.

In view of such technical issues, objects of an embodiment described below is to reduce the circuit scale by reducing the number of comparators (number of thresholds) used for decoding a code according to the new mode and also to realize relaxation of setting precision of the thresholds. Needless to say, the embodiment described below will also solve the issue described above (Summary 1 of issues). An embodiment capable of achieving such objects will be described below.

<Embodiment>

An embodiment of the present invention will be described. The present embodiment is intended to reduce the number of times of threshold determination processing performed when bit values are decoded from a code that does not contain any DC component and needs no PLL circuit during clock reproduction. Particularly, the present embodiment is based on the technology according to the above new mode and concerns a technology that efficiently removes a clock signal on the receiving side.

[Function Configuration of a Mobile Terminal 400]

First, the function configuration of the mobile terminal 400 according to the present embodiment will be described with reference to FIG. 14. FIG. 14 is an explanatory view illustrating a function configuration example of the mobile terminal 400 according to the present embodiment. However, FIG. 14 is an explanatory view drawn by focusing on the function configuration of the serializer 134 and the deserializer 138 and other components are omitted. The same reference numerals are attached to, among components of the mobile terminal 400, components having substantially the same function as those of the mobile terminal 300 described above and a detailed description thereof is omitted.

(Serializer 134)

The serializer 134 includes the P/S conversion unit 152, the driver 156, the PLL unit 158, the timing control unit 160, the superimposing unit 232, and the encoder 312. The serializer 134 in the mobile terminal 400 is substantially the same as that in the mobile terminal 300 except that the superimposing unit 232 is provided. The function configuration of the superimposing unit 232 is substantially the same as that provided in the mobile terminal 230.

First, parallel signals (P-DATA) and a clock for parallel signals (P-CLK) are input from the baseband processor 110 into the serializer 134. The parallel signals input into the serializer 134 are converted into a serial signal by the P/S conversion unit 152. The serial signal converted by the P/S conversion unit 152 is input into the encoder 312. The encoder 312 adds a header and the like to the serial signal and encodes the serial signal based on the predetermined coding mode (new mode) to generate an encoded signal.

The encoded signal generated by the encoder 312 is input into the driver 156. The driver 156 converts the input serial signal into an LVDS and then inputs the LVDS into the superimposing unit 232. The superimposing unit 232 transmits the signal input from the driver 156 to the deserializer 138 by superimposing the signal on a power line. For example, the superimposing unit 232 couples the signal by a capacitor and a power supply by a choke coil. Then, the signal superimposed on the power supply by the superimposing unit 232 is input into the deserializer 138 through the power line.

The clock for parallel signals input into the serializer 134 is input into the PLL unit 158. The PLL unit 158 generates a clock for serial signal from the clock for parallel signals and inputs the clock for serial signal into the P/S conversion unit 152 and the timing control unit 160. The timing control unit 160 controls transmission timing of the serial signal by the encoder 312 based on the input clock for serial signal.

(Deserializer 138)

The deserializer 138 mainly includes the separation unit 234, the receiver 172, the S/P conversion unit 176, the timing control unit 182, and a decoding processing unit 402. The decoding processing unit 402 includes a decoder 404 and a clock detection unit 406. Like the above mobile terminal 300, the clock detection unit 406 is not provided with any PLL. A main difference from the mobile terminal 300 lies in the function of the decoding processing unit 402.

First, a signal obtained by superimposing a serial signal on a power supply is input into the deserializer 138 through a power line (coaxial cable). The superimposed signal is separated into a serial signal and a power supply by the separation unit 234. For example, the separation unit 234 extracts a serial signal by cutting off a DC component using a capacitor and a power supply by cutting off high-frequency components using a choke coil. The serial signal separated by the separation unit 234 is received by the receiver 172.

The serial signal received by the receiver 172 is input into the decoder 404 and the clock detection unit 406 included in the decoding processing unit 402. The decoder 404 detects a starting portion of data by referencing the header of the input serial signal and decodes the serial signal encoded by the coding mode used by the encoder 312. The serial signal decoded by the decoder 404 is input into the S/P conversion unit 176. The S/P conversion unit 176 converts the input serial signal into parallel signals (P-DATA). The parallel signals converted by the S/P conversion unit 176 are output to the liquid crystal unit 104.

On the other hand, the clock detection unit 406 detects a clock component from the signal received by the receiver 172. At this point, the clock detection unit 406 detects the period of the polarity reversal by comparing the amplitude value of the signal and the threshold L0 (potential 0) and reproduces the original clock by detecting a clock component based on the period. Then, the clock reproduced by the clock detection unit 406 is input into the decoder 404 and the timing control unit 182. The timing control unit 182 controls reception timing based on the clock input from the clock detection unit 406. The clock (P-CLK) input into the timing control unit 182 is output to the liquid crystal unit 104.

[Circuit Configuration Example of the Decoding Processing Unit 402]

Figure 15:
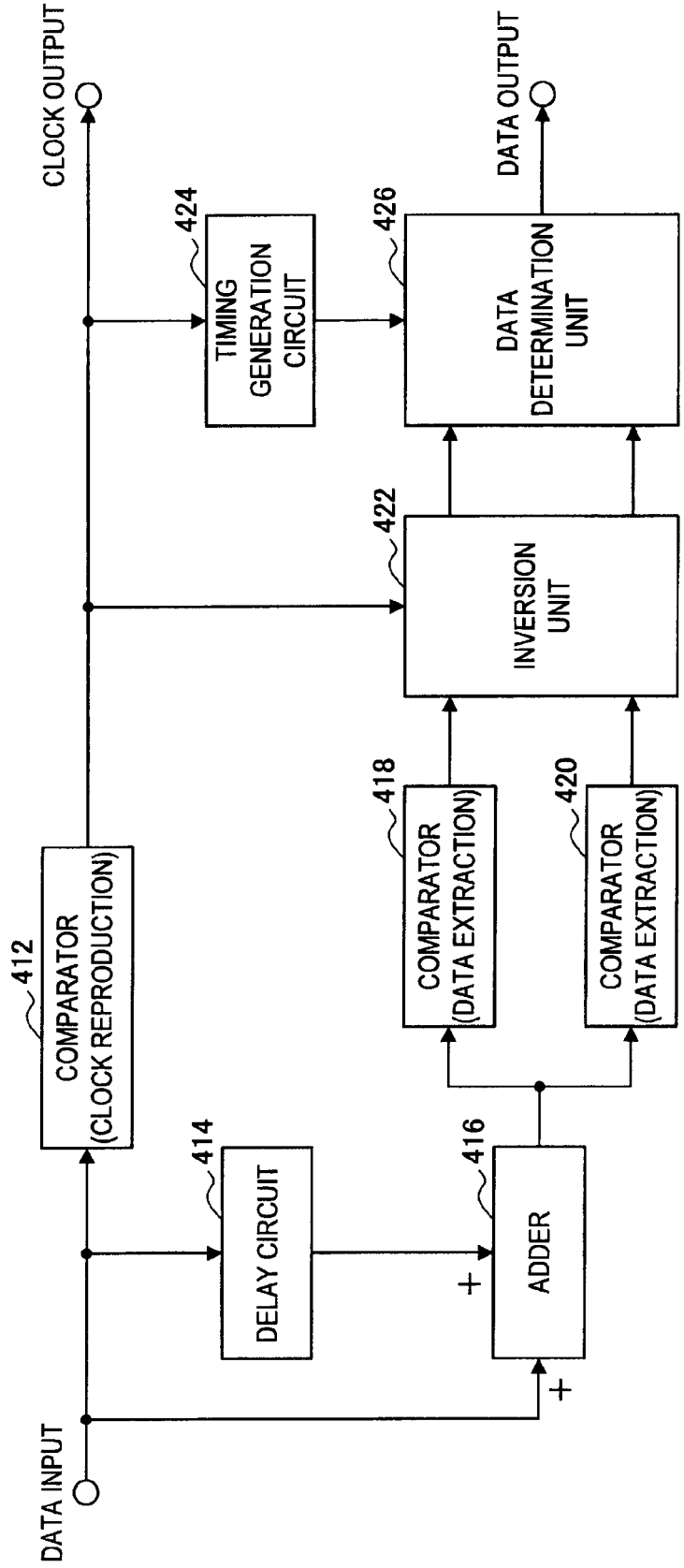
FIG. 15 shows a circuit configuration example of a signal processing unit according to the embodiment.

Here, the circuit configuration of the decoding processing unit 402 will be described with reference to FIG. 15. FIG. 15 is an explanatory view showing a circuit configuration example of the decoding processing unit 402.

As shown in FIG. 15, the decoding processing unit 402 has a comparator 412 (clock reproduction), a delay circuit 414, an adder 416, comparators 418 and 420 (data extraction), an inversion unit 422, a timing generation circuit 424, and a data determination unit 426. The comparator 412 (clock reproduction) corresponds to the clock detection unit 406. Other components except the clock detection unit 406 correspond to the decoder 404.

First, when a serial signal is input into the decoding processing unit 402, the input signal is input into the comparator 412, the delay circuit 414, and the adder 416. The threshold L0 shown in FIG. 8 is set to the comparator 412 and the amplitude value of the input signal and the threshold L0 are compared. If, for example, the amplitude value of the input signal is larger than the threshold L0, a determination value 1 is output from the comparator 412 and, if the amplitude value of the input signal is smaller than the threshold L0, a determination value 0 is output. The polarity reversal period of the input signal is detected by detecting the period of change of the determination value output from the comparator 412. That is, a clock component of the input signal is extracted based on the output value of the comparator 412. The clock component is input into the inversion unit 422, the timing generation circuit 424 and the like.

On the other hand, the input signal input into the delay circuit 414 is delayed by ½ clock. Then, the delayed signal is input into the adder 416. In addition to the delayed signal input from the delay circuit 414, the input signal is input into the adder 416. When the delayed signal and the input signal are input into the adder 416, the delayed signal and the input signal are added by the adder 416. An addition signal added by the adder 416 is input into the comparators 418 and 420. A threshold L2' is set to the comparator 418 and the amplitude value of the addition signal and the threshold L2' are compared. A threshold L3' is set to the comparator 420 and the amplitude value of the addition signal and the threshold L3' are compared.

As described below in detail, a clock component contained in the input signal and delayed signal are canceled out and removed by addition processing performed by the adder 416. Thus, an addition signal output from the adder 416 contains no clock component.

When an addition signal is input into the comparator 418, the comparator 418 compares the amplitude value of the addition signal and the threshold L2' to determine whether the amplitude value of the addition signal is larger than the threshold L2'. If the amplitude value of the addition signal is larger than the threshold L2', the comparator 418 outputs a determination value (for example, 1) indicating that the amplitude value of the addition signal is larger than the threshold L2'. If, on the other hand, the amplitude value of the addition signal is not larger than the threshold L2', the comparator 418 outputs a determination value (for example, 0) indicating that the amplitude value of the addition signal is not larger than the threshold L2'. Similarly, the comparator 420 compares the amplitude value of the addition signal and the threshold L3' to determine whether the amplitude value of the addition signal is larger than the threshold L3'. Determination values output from the comparators 418 and 420 are input into the inversion unit 422.

Figures 16, 17, 18:
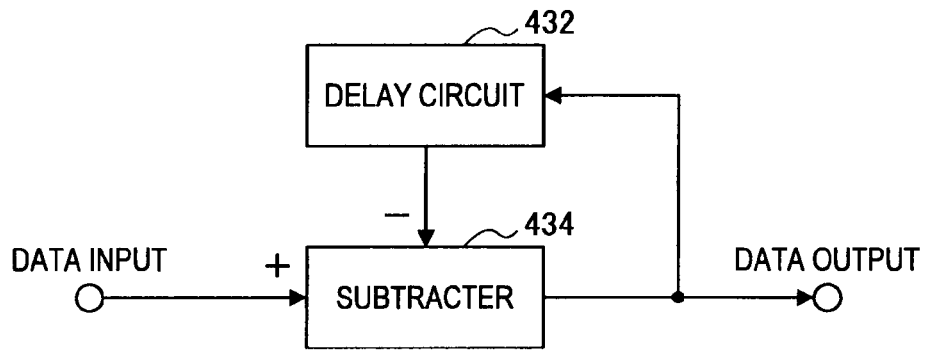
FIG. 16 shows a circuit configuration example of an inversion unit according to the embodiment.
FIG. 17 exemplifies comparator output and an input data value conversion algorithm for input of the inversion unit according to the embodiment.
FIG. 18 exemplifies a data determination algorithm according to the embodiment.

The inversion unit 422 is means for performing signal processing corresponding to inversion of signal processing performed by the delay circuit 414 and the adder 416. The function of the inversion unit 422 is realized by, for example, the circuit configuration shown in FIG. 16. As shown in FIG. 16, the inversion unit 422 includes a delay circuit 432 and a subtracter 434. Determination values output from the comparators 418 and 420 are input into the terminal denoted as "Data input" in FIG. 16. The terminal denoted as "Data output" is connected to the data determination unit 426.

As is understood from FIG. 16, the delay circuit 432 is provided subsequent to the subtracter 434 and is used to input output data of the subtracter 434 after the output data being delayed. The delay circuit 432 delays output data of the subtracter 434 by ½ clock. Thus, when determination values output from the comparators 418 and 420 are input into the subtracter 434, the subtracter 434 subtracts delayed data of data previously output by the subtracter 434 itself from data of the input determination values. Processing by the delay circuit 414 and the adder 416 corresponds to Z conversion shown in Formula (1) below. On the other hand, processing by the inversion unit 422 corresponds to inversion shown in Formula (2) below.

$$Y = (1+Z^{-1})*X;\ X\text{:input, }Y\text{:output} \quad (1)$$

$$Y' = X' - Z^{-1}*Y';\ X'\text{:input, }Y'\text{:output} \quad (2)$$

The correspondence (input data value conversion algorithm) between output of the comparators 418 and 420 and data before inversion is represented as shown in FIG. 17. If, for example, output of the comparator 418 is 1 and that of the comparator 420 is 1, these output results are converted into data "1" immediately after being input into the inversion unit 422. Also, if output of the comparator 418 is 0 and that of the comparator 420 is 1, these output results are converted into data "0" immediately after being input into the inversion unit 422. Further, if output of the comparator 418 is 0 and that of the comparator 420 is 0, these output results are converted into data "−1" immediately after being input into the inversion unit 422. Then, the inversion unit 422 performs inversion processing using data after being converted. Data after being inverted is input into the data determination unit 426.

FIG. 15 will be referenced again. As described above, data after being inverted is input into the data determination unit 426 from the inversion unit 422. Also, a clock component detected by the comparator 412 is input into the data determination unit 426 via the timing generation circuit 424. Then, the data determination unit 426 restores the original data from the data input from the inversion unit 422. At this point, the data determination unit 426 restores the original data based on an algorithm shown in FIG. 18 and outputs the original data to the S/P conversion unit 176.

If, for example, data 1 is input from the inversion unit 422, the data determination unit 426 outputs data 1. If data 0 is input from the inversion unit 422, the data determination unit 426 outputs data 0. Further, if data −1 is input from the inversion unit 422, the data determination unit 426 outputs data 1. The above processing corresponds to processing to restore the original data from the code (A) in FIG. 8. The code (A) in FIG. 8 allocates the amplitudes −1 and 1 to data 1 and the amplitude 0 to data 0. Thus, the data determination unit 426 restores data 1 from the amplitudes −1 and 1 and data 0 from the amplitude 0.

(Overall Flow of Signal Processing)

Figure 19:
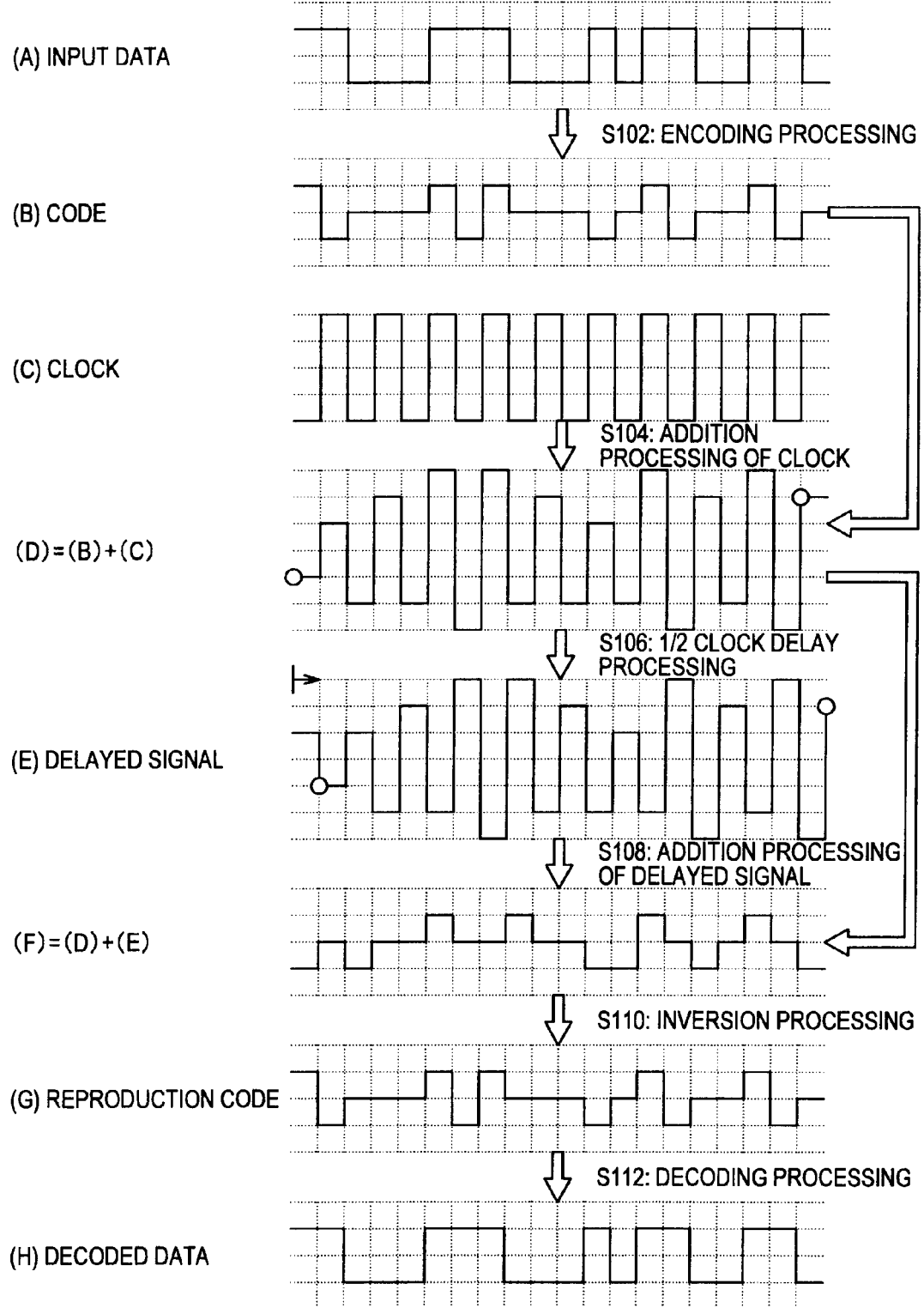
FIG. 19 exemplifies a signal processing method according to the embodiment.
Figure 20:
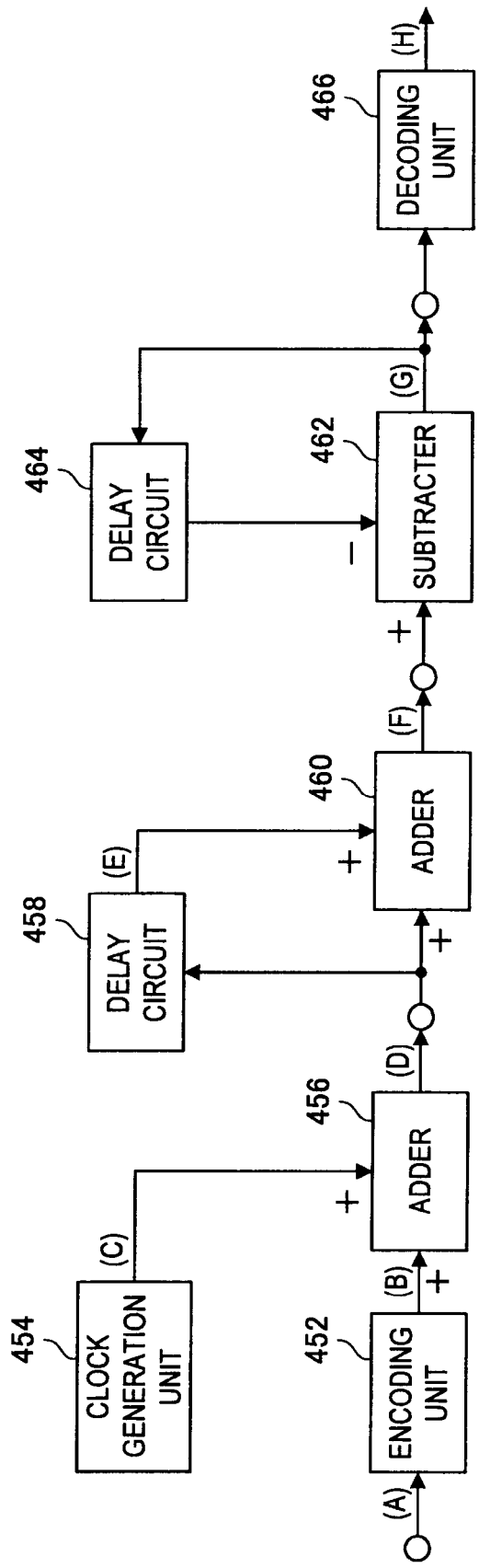
FIG. 20 exemplifies the circuit configuration related to a signal processing method in the embodiment.

Here, the overall flow of signal processing concerning the serializer 134 and deserializer 138 of the mobile terminal 400 will be described with reference to FIG. 19 and FIG. 20. FIG. 19 is an explanatory view showing the overall flow of the signal processing. FIG. 20 is an explanatory view showing a circuit configuration example capable of realizing the signal processing.

First, FIG. 19 will be referenced. In FIG. 19, shapes (A) to (H) of code in each step are drawn.

First, input data (A) is input into the serializer 134. Encoding processing (S102) is performed on the input data (A) by the encoder 312 to generate a code (B). Further, a clock (C) generated by the PLL unit 158 is input into the encoder 312 to perform addition processing (S104) of the code (B) and the clock (C). A code (D) is generated by the addition processing (S104). In the mobile terminal 400, as described above, the code (D) is transmitted to the deserializer 138 by being superimposed on a power line.

When the code (D) is input into the deserializer 138, the code (D) is delayed (S106) by ½ clock by the delay circuit 414 to generate a delayed signal (E). Further, the code (D) before being delayed and the delayed signal (E) are added by the adder 416 (S108). At this point, a clock component contained in the code (D) is canceled out to generate a code (F). Thus, a signal like the clock (C) whose absolute amplitude is constant and whose polarity is reversed in each half period can be removed by adding after whose phase being shifted by half period.

However, a component corresponding to the code (B) is also added after being delayed by ½ clock. Thus, inversion processing (S110) corresponding to the above Formula (2) is performed on the code (F) by the inversion unit 422. While the delay processing (S106) and the addition processing (S108) described above are performed on the code (D) containing a clock component, the above inversion processing (S110) is performed on the code (E) after a clock component thereof being removed. However, the Z conversion shown in the above Formula (1) can be expanded like Formula (3) shown below and thus, the same result can be obtained regardless of whether inversion processing is performed on the code (D) or the code (F).

$$X = X0 + C; X0: \text{code}(B), C: \text{clock}(C) \qquad (3)$$

$$Y = (1 + Z^{-1}) * X$$
$$= (1 + Z^{-1}) * (X0 + C)$$
$$= X0 + C + Z^{-1} * X0 + Z^{-1} * C$$
$$= X0 + Z^{-1} * X0 + (C + Z^{-1} * C)$$
$$= X0 + Z^{-1} * X0$$

where $(C+Z^{-1}*C)$ is addition of a delayed clock $Z^{-1}*C$ obtained by delaying the clock (C) by half period and the original clock (C). That is, signals having the same absolute value and opposite signs are added. Thus, both signals cancel out, yielding $(C+Z^{-1}*C)=0$. The fourth equal sign concerning Y in the above Formula (3) holds for the above reason.

When the above inversion processing (S110) is performed, a reproduction code (G) is generated. The reproduction code (G) corresponds to the code (B). Thus, data is decoded based on the encoding method used for generating the code (B) from the input data (A) (S112). As a result of the decoding processing (S112), decoded data (H) is obtained. As described above, a clock component is removed by performing the delay processing (S106) and the addition processing (S108) of the delayed signal so that the number of amplitudes to be determined is reduced.

Here, the above inversion processing (S110) will be described in detail by citing a concrete example. Processing to generate the code (G) from the code (F) shown in FIG. 19 is represented by a table shown below. For convenience of description, other processing is also contained. The columns <1> to <8> in the table below represent timing.

TABLE

|  | <1> | <2> | <3> | <4> | <5> | <6> | <7> | <8> |
|---|---|---|---|---|---|---|---|---|
| Amplitude of (B): | (1), | −1, | 0, | 0, | 0, | 1, | −1, | 1 |
| Amplitude of (D): | −1, | 1, | −2, | 2, | −2, | 3, | −3, | 3 |
| Amplitude of (E): | , | −1, | 1, | −2, | 2, | −2, | 3, | −3 |
| Amplitude of (F): | , | 0, | −1, | 0, | 0, | 1, | 0, | 0 |
| Output of the delay circuit 432: | , | (1), | −1, | 0, | 0, | 0, | 1, | −1 |
| Output of the subtracter 434: | (1), | −1, | 0, | 0, | 0, | 1, | −1, | 1 |

As described above, the code (D) is generated from the code (B) and the code (D) is delayed by ½ clock to generate the code (E). Further, the code (D) and the code (E) are added to generate the code (F). Then, the code (G) is generated based on the code (F).

Processing to generate the code (G) from the code (F) will be described with reference to FIG. 16. First, the amplitude value 0 of the code (F) described in the column <8> is observed. In timing of the amplitude value 0 being input into the subtracter 434, the output value −1 delayed by the delay circuit 432 after being output from the subtracter 434 in the last timing is input into the subtracter 434. Then, the output value −1 of the delay circuit 432 is subtracted from the amplitude value 0 of the code (F) and the output value 1 is output from the subtracter 434. Similarly, in the columns <2> to <7>, data (G) after being inverted is output from the subtracter 434.

However, it is necessary to perform processing concerning the column <1> with a little caution. As described above, the code (F) is generated based on the code (E) obtained by delaying the code (D) by ½ clock. Thus, the output value of the subtracter 434 is not determined for the column <1> in which the code (E) contains no data. Therefore, for example, a preset value is used as the output value of the subtracter 434 in the column <1>. That is, a predetermined bit value is allocated to the first bit of input data. In the example of the above table, the bit value 1 is allocated. Thus, in timing of the column <1>, the amplitude value of the code (B) is set to 1 and the output value of the subtracter 434 to 1. Numbers in parentheses in the above table indicate such values.

Thus, the code (B) is reproduced from the code (D) through the delay processing (S106), the addition processing (S108) of a delayed signal, and the inversion processing (S110).

FIG. 20 shows an example of the circuit configuration capable of realizing a sequence of processing shown in FIG. 19. As shown in FIG. 20, the input data (A) is input into an encoding unit 452 to generate the code (B). The code (B) generated by the encoding unit 452 is input into an adder 456. At this point, the clock (C) generated by a clock generation unit 454 is input into the adder 456. Then, the code (B) and the clock (C) are added by the adder 456 to generate the code (D).

The code (D) is transmitted from the serializer 134 to the deserializer 138 before being input into a delay circuit 458 and an adder 460. The delay circuit 458 delays the code (D) by ½ clock and inputs the delayed signal (E) into the adder 460. The adder 460 adds the code (D) and the delayed signal (E) and then inputs the code (F) into a subtracter 462. The subtracter 462 subtracts the output value of a delay circuit 464 from the code (F). As described above, data output from the subtracter 462 in the last timing is input into the delay circuit 464. Then, data delayed by the delay circuit 464 by ½ clock is input into the subtracter 462. The code (G) output from the subtracter 462 is input into a decoding unit 466. The code (G) is decoded by the decoding unit 466 to output the decoded data (H).

(Effect)

Figure 21:
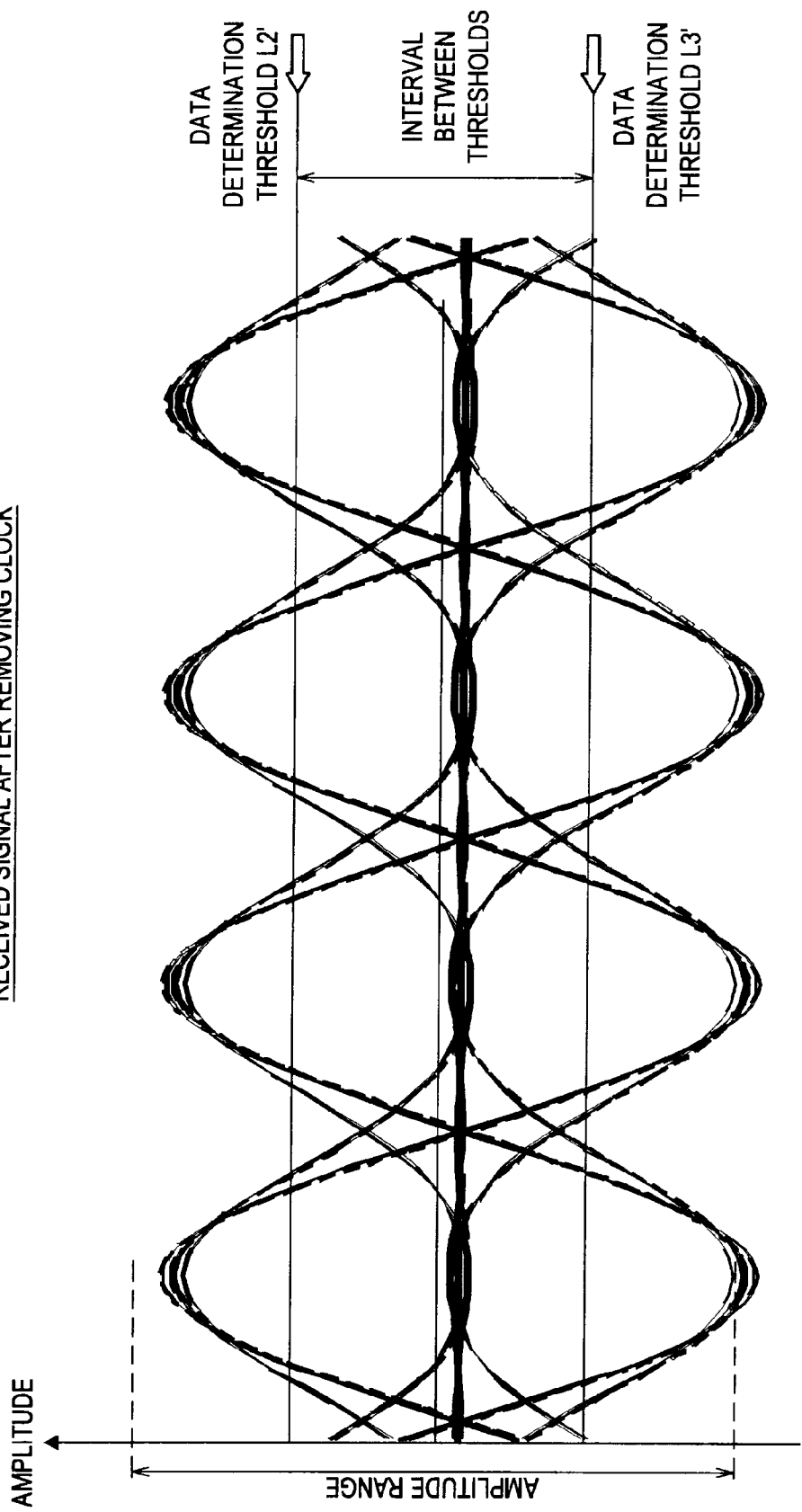
FIG. 21 exemplifies a data determination method according to the embodiment.

A signal waveform as shown in FIG. 21 is generated by the delay processing (S106) and the addition processing (S108) of the delayed signal being performed. As described above, a clock component is removed from a signal by the above processing being performed. Thus, data can be determined by using two data determination thresholds (for example, the thresholds L3 and L4). By removing the clock component in this manner, the number of data determination thresholds can be reduced. As a result, the number of comparators used for data determination processing can be reduced so that the circuit scale of the mobile terminal 400 can be reduced. Further, when compared with a signal waveform in the new mode shown in FIG. 13, the interval of thresholds can be broadened so that setting precision of the data determination threshold can be relaxed.

(Modification: Configuration of Digitization After Inversion)

Figure 22:
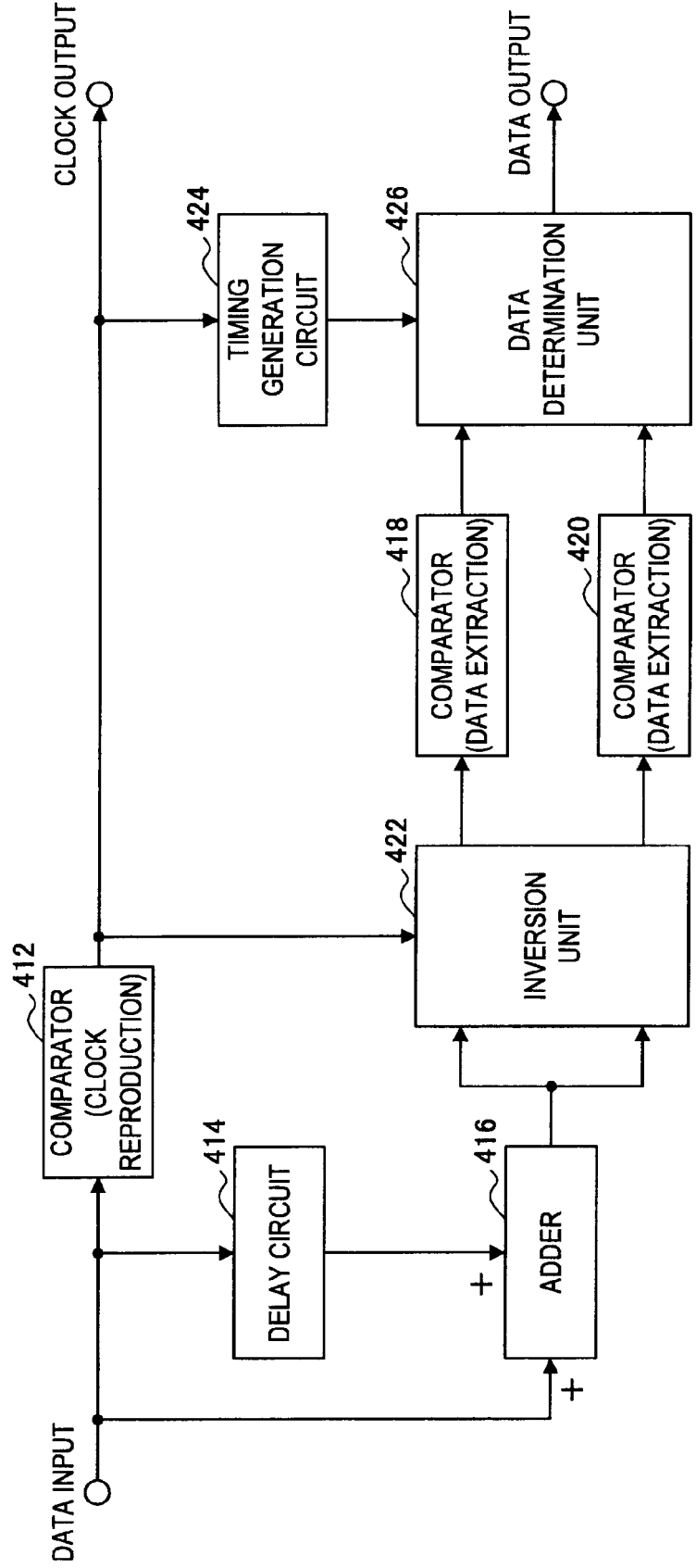
FIG. 22 shows a circuit configuration example of a signal processing unit according to the embodiment.

Next, a modification of the decoding processing unit 402 will be described with reference to FIG. 22. In FIG. 22, a circuit configuration example of the decoding processing unit 402 is drawn. A difference between a circuit configuration example shown in FIG. 15 and that shown in FIG. 22 lies in the arrangement of the comparators 418 and 420. In the example in FIG. 22, the comparators 418 and 420 are provided subsequent to the inversion unit 422. That is, the amplitude value of a signal on which inversion processing is performed is determined before digitization. Even if the arrangement of the comparators 418 and 420 is changed, an effect similar to that in the circuit configuration example shown in FIG. 15 can be obtained.

In the foregoing, the function configuration of the mobile terminal 400 according to the present embodiment, the signal processing method, the circuit configuration of the decoding processing unit 402 and the like have been described. In the present embodiment, as described above, an encoded signal in the new mode is transmitted from the transmitting side and a clock component is removed by performing processing of delayed addition on the receiving side. As a result, the number of thresholds used for data determination is reduced and the scale of a circuit used for data determination is reduced. Further, the interval between data determination thresholds is broadened and therefore, setting precision of the threshold is relaxed. As described above, inversion processing is performed on a signal from which a clock component is removed and further the original data is restored from the signal after being inverted.

[Summary]

Lastly, the function configuration held by a mobile terminal in the present embodiment and operation effects obtained from the function configuration will be briefly summarized. The mobile terminal has a first information processing module corresponding to the operation unit 108 and a second information processing module corresponding to the display unit 102.

The first information processing module has a function to transmit a signal encoded in such a way that a first bit of input data containing the first bit and a second bit value that are mutually different is represented by a plurality of first amplitude values, the second bit value is represented by a second amplitude value that is different from the first amplitude values, the same amplitude value is not taken successively, and polarity of the amplitude value is reversed in each period.

The second information processing module has a signal receiving unit, conversion processing unit, inversion processing unit, and input data decoding unit. The signal receiving unit is used to receive a signal transmitted from the first information processing module. As described above, the signal is formed in such a way that polarity of the amplitude value is reversed in each period. Thus, a clock can be reproduced by detecting the polarity reversal period of the signal without using any PLL. The conversion processing unit is used to perform conversion processing to add a signal after being delayed by delaying an input signal by one period to the signal before being delayed on a signal received by the signal receiving unit. A clock component contained in the received signal can be removed by this conversion processing.

The inversion processing unit is used to perform inverse processing of the conversion processing on a signal output from the conversion processing unit. While a clock component is removed by the conversion processing unit, a signal before the clock being superimposed is also delayed and added when the clock is removed. Thus, the inversion processing unit performs inverse processing of the conversion processing on the delayed and added signal to restore the signal before the clock being superimposed on. Further, the input data decoding unit determines the first and second bit values based on the amplitude values of signal output from the inversion processing unit to restore the input data. When the conversion processing is performed, the clock component is removed from the signal so that the number of amplitude values of signal used for data determination is reduced. As a result, the number of thresholds used for data determination processing is reduced. Moreover, the interval between thresholds is broadened so that setting precision of the threshold used for data determination is relaxed.

The inversion processing unit may include a delay circuit to delay an input signal by one period and a subtraction circuit that, when first and second signals are input, subtracts the second signal from the first signal. In this case, the delay circuit is configured in such a way that an output signal of the subtraction circuit is input. Further, the subtraction circuit is configured in such a way that an output signal of the conversion processing unit is input into the subtraction circuit as the first signal and that of the delay circuit as the second signal. By adopting such a circuit configuration, the above inversion processing is realized.

The second information processing module may further include a clock component detection unit that detects a clock component of an encoded signal based on a reversal period by detecting the reversal period of polarity held by the amplitude value of the encoded signal received by the signal receiving unit. By adopting such a configuration, thanks to the clock component detection unit, a clock can be reproduced without using any PLL. In this case, the input data decoding unit uses the clock component detected by the clock component detection unit to be able to obtain the input data by decoding.

The first information processing module may further include an encoded signal generation unit that generates an encoded signal X with a transmission speed Fb in which the first bit is represented by the amplitude value 0 and the second bit value is represented by repetition of amplitude values A and −A (A is any real number), a clock signal addition unit that adds a clock signal having an amplitude value n*A (n>1) and a frequency Fb/2 to the encoded signal X with the transmission speed Fb generated by the encoded signal generation unit, and a signal transmission unit that transmits the signal output from the clock signal addition unit to the signal receiving unit via a predetermined transmission line. Thus, the signal transmitted from the first information processing module can be generated by adding a clock to a signal encoded according to a predetermined encoding mode.

The predetermined transmission line may be a power line through which a DC current is passed. In this case, an output signal of the clock signal addition unit is transmitted after being superimposed on the DC current by the signal transmission unit and separated from the DC current by the signal receiving unit. The encoded signal transmitted from the first information processing module to the second information processing module contains no DC current. Thus, the encoded signal can be transmitted through a power line through which a DC current is passed. As a result, power and signals can be transmitted by providing only one power line in a portion connecting the first and second information processing modules so that flexibility of deformation in the connecting portion can be improved.

The conversion processing unit may be configured in such a way that two amplitude values corresponding to the first bit and one amplitude value corresponding to the second bit value are extracted using two comparators from a signal on which the conversion processing is performed to input the amplitude values into the inversion processing unit. The inversion processing unit may be configured in such a way that two amplitude values corresponding to the first bit and one amplitude value corresponding to the second bit value are extracted using two comparators from a signal on which inverse processing of the conversion processing is performed to input the amplitude values into the input data decoding unit. Thus, processing to determine the amplitude values using two comparators may be performed prior to the inversion processing unit or after inversion processing of the conversion processing by the inversion processing unit.

The receiver 172 and the separation unit 234 are examples of the signal receiving unit. The decoding processing unit 402, the decoder 404, the delay circuits 414 and 458, and the adders 416 and 460 are examples of the conversion processing unit. The decoding processing unit 402, the decoder 404, and the inversion unit 422 are examples of the inversion processing unit. The data determination unit 426 and the decoding unit 466 are examples of the input data decoding unit. The comparators 418 and 420 are examples of the conversion processing unit, inversion processing unit, or input data decoding unit. The delay circuits 432 and 464 are examples of the delay circuit included in the inversion processing unit. The subtracters 434 and 462 are examples of the subtraction circuit included in the inversion processing unit. The clock detection unit 406 and the comparator 412 are examples of the clock component detection unit. The encoder 312, the encoding unit 452, and the adder 456 are examples of the encoded signal generation unit and the clock signal addition unit. The driver 156 and the superimposing unit 232 are examples of the signal transmission unit.

It should be understood by those skilled in the art that various modifications, combinations, sub-combinations and alterations may occur depending on design and other factors insofar as they are within the scope of the appended claims or the equivalents thereof.

In the above embodiment, for example, the AMI code is taken as an example of a code input into the adder ADD, but technology of the present invention is not limited to this. As described above, various kinds of bipolar codes and codes PR (1, −1), (1, 0, −1), (1, 0, . . . , 0, −1) and the like in partial response mode can be used. Thus, any coding mode using the polarity reversal is suitably used. Such codes can be generated also by bit shifts. Thus, some modifications concerning the generation method of code can be imagined.

In the above description, a case in which technology of the present embodiment is applied to signal transmission between the serializer 134 and the deserializer 138 forming the mobile terminal 400 is illustrated and technology of the present embodiment is described based on this example. However, technology of the present embodiment can be used when a signal is transmitted between two information transmission modules having any configuration. For example, technology of the present embodiment can be used when two information processing apparatuses are connected by a power line. In this case, two information processing apparatuses are formed as separate apparatuses. Moreover, the type of such information processing apparatuses is arbitrary and includes mobile information terminals such as mobile phones, PHS (Personal Handy-phone System), and PDA (Personal Digital Assistant). Further, home game machines, TV sets, and recording/reproducing apparatuses are also included in the information processing apparatuses.

The present application contains subjected matter related to that disclosed in Japanese Priority Patent Application JP 2008-226346 filed in the Japan Patent Office on Sep. 3, 2008, the entire contents of which is hereby incorporated by reference.

What is claimed is:

1. An information processing apparatus, comprising:
a signal receiving unit that receives a signal encoded in such a way that a signal containing a first bit and a second bit value that are mutually different, wherein the first bit value is represented by a plurality of first amplitude values, and the second bit value is represented by a second amplitude value that is different from the first amplitude values, a same encoded signal amplitude value does not occur successively, and polarity of the encoded signal amplitude value is reversed in each period;
a conversion processing unit that performs conversion processing to add a delayed signal that is delayed by delaying the signal received by the signal receiving unit by one period of the received signal;
an inversion processing unit that performs inverse processing of the conversion processing on the signal output from the conversion processing unit; and
an input data decoding unit that decodes an input data by determining the first and second bit values based on the amplitude value of the signal output from the inversion processing unit.

2. The information processing apparatus according to claim 1, wherein the inversion processing unit, including:
a delay circuit that delays the input signal by one period; and
a subtraction circuit that, when first and second signals are input, subtracts the second signal from the first signal, wherein
an output signal of the delay circuit is input into the delay circuit and the output signal of the conversion processing unit is input into the subtraction circuit as the first signal and that of the delay circuit as the second signal.

3. The information processing apparatus according to claim 2, further comprising a clock component detection unit that detects a clock component of an encoded signal based on a reversal period by detecting the reversal period of polarity held by the amplitude value of the encoded signal received by the signal receiving unit, wherein the input data decoding unit uses the clock component detected by the clock component detection unit to obtain the input data by decoding.

4. The information processing apparatus according to claim 1, further comprising:

an encoded signal generation unit that generates an encoded signal X with a transmission speed Fb in which the first bit is represented by the amplitude value 0 and the second bit value is represented by repetition of amplitude values A and −A (A is any real number);

a clock signal addition unit that adds a clock signal having an amplitude value n*A (n>1) and a frequency Fb/2 to the encoded signal X with the transmission speed Fb generated by the encoded signal generation unit; and a signal transmission unit that transmits the signal output from the clock signal addition unit to the signal receiving unit via a predetermined transmission line.

5. The information processing apparatus according to claim 4, wherein the predetermined transmission line is a power line through which a DC current is passed and the output signal of the clock signal addition unit is transmitted after being superimposed on the DC current by the signal transmission unit and separated from the DC current by the signal receiving unit.

6. The information processing apparatus according to claim 1, wherein the conversion processing unit extracts two amplitude values corresponding to the first bit and one amplitude value corresponding to the second bit value using two comparators from a signal on which the conversion processing is performed to input the amplitude values into the inversion processing unit.

7. The information processing apparatus according to claim 1, wherein the inversion processing unit extracts two amplitude values corresponding to the first bit and one amplitude value corresponding to the second bit value using two comparators from a signal on which inverse processing of the conversion processing is performed to input the amplitude values into the input data decoding unit.

8. The information processing apparatus according to claim 1, wherein the first bit value represents a data bit and the second bit value a clock signal, and wherein the second amplitude value is always greater in magnitude than the first amplitude value.

9. A signal determination method, comprising the steps of:
receiving a signal encoded in such a way that a signal containing a first bit and a second bit value that are mutually different, wherein the first bit value is represented by a plurality of first amplitude values, and the second bit value is represented by a second amplitude value that is different from the first amplitude values, a same encoded signal amplitude value does not occur successively, and polarity of the encoded signal amplitude value is reversed in each period;

performing conversion processing to add a delayed signal that is delayed by delaying the signal received in the signal receiving step by one period of the received signal;

performing inverse processing of the conversion processing on the signal on which the conversion processing is performed in the conversion processing step; and decoding an input data by determining the first and second bit values based on the amplitude value of the signal on which the inverse processing is performed in the inversion processing step.

10. The signal determination method according to claim 9, wherein the inversion processing step, includes:
delaying the input signal by one period; and
subtracting the second signal from the first signal, when first and second signals are input, wherein
an output signal of the delaying step is input into the delaying step and
the output signal of the performing conversion processing step is an input into the subtraction step as the first signal and that of the delaying step as the second signal.

11. The signal determination method according to claim 10, further comprising
detecting a clock component of an encoded signal based on a reversal period by detecting the reversal period of polarity held by the amplitude value of the encoded signal received in the receiving step, wherein
using the detected clock component to obtain the input data by decoding.

12. The signal determination method according to claim 9, further comprising:
generating an encoded signal X with a transmission speed Fb in which the first bit is represented by the amplitude value 0 and the second bit value is represented by repetition of amplitude values A and −A (A is any real number);
adding a clock signal having an amplitude value n*A (n>1) and a frequency Fb/2 to the encoded signal X with the transmission speed Fb generated by the generating step; and
transmitting the signal output from the addition step via a predetermined transmission line.

13. The signal determination method according to claim 12, wherein
the predetermined transmission line is a power line through which a DC current is passed and
the output signal of the adding step is transmitted after being superimposed on the DC current by the transmitting step and separated from the DC current by the receiving step.

14. The signal determination method according to claim 9, wherein the conversion processing step extracts two amplitude values corresponding to the first bit and one amplitude value corresponding to the second bit value using two comparators from a signal on which the conversion processing is performed to input the amplitude values into the inverse processing step.

15. The signal determination method according to claim 9, wherein the inversion processing step extracts two amplitude values corresponding to the first bit and one amplitude value corresponding to the second bit value using two comparators from a signal on which inverse processing of the conversion processing is performed to input the amplitude values into the decoding an input data step.

16. The signal determination method according to claim 9, wherein the first bit value represents a data bit and the second bit value a clock signal, and wherein the second amplitude values are always greater in magnitude than the first amplitude values.

* * * * *